United States Patent
Suenderhauf et al.

(10) Patent No.: US 8,671,034 B2
(45) Date of Patent: Mar. 11, 2014

(54) PROVIDING HUMAN CAPITAL MANAGEMENT SOFTWARE APPLICATION AS ENTERPRISE SERVICES

(75) Inventors: Philipp Suenderhauf, Leimen (DE); Matthias Richter, Sinsheim (DE); Frank Schuhmacher, St. Leon-Rot (DE); Thomas Moser, Wiesloch (DE); Ricardo Bustamante, Kronau (DE); Peter Sieber, Wiesloch (DE); Matthias Tebbe, Walldorf (DE); Horst Vaeth, Mannheim (DE); Silke A. H. Gruber, Sinsheim (DE); Fabian Guenther, Mauer (DE); Marc Moesges, Heidelberg (DE); Volker Paul, Herxheim (DE); Marcus Philipp, Dielheim (DE); Guy Cases-Langhoff, Rauenberg (DE); Jens Ruths, Wiesloch (DE); Peter Latocha, Malsch (DE); Andreas Bold, Ludwigshafen (DE)

(73) Assignee: SAP AG, Walldorf (DE)

( * ) Notice: Subject to any disclaimer, the term of this patent is extended or adjusted under 35 U.S.C. 154(b) by 1339 days.

(21) Appl. No.: 11/968,054

(22) Filed: Dec. 31, 2007

(65) Prior Publication Data
US 2009/0171698 A1 Jul. 2, 2009

(51) Int. Cl.
*G06F 19/00* (2011.01)
*G06F 17/00* (2006.01)

(52) U.S. Cl.
USPC .................................. 705/30; 705/8

(58) Field of Classification Search
USPC ...................................... 705/30, 31
See application file for complete search history.

(56) References Cited

U.S. PATENT DOCUMENTS

| | | | |
|---|---|---|---|
| 4,947,321 A | 8/1990 | Spence et al. | |
| 5,550,734 A | 8/1996 | Tarter et al. | |
| 5,560,005 A | 9/1996 | Hoover et al. | |
| 5,586,312 A * | 12/1996 | Johnson et al. | 1/1 |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,768,119 A | 6/1998 | Havekost et al. | |
| 5,822,585 A | 10/1998 | Nobel et al. | |
| 5,832,218 A | 11/1998 | Gibbs et al. | |
| 5,848,291 A | 12/1998 | Milne et al. | |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.: pp. 190-200.

(Continued)

*Primary Examiner* — Garcia Ade
(74) *Attorney, Agent, or Firm* — Fish & Richardson P.C.

(57) ABSTRACT

Methods and apparatus, including systems and computer program products, for a service architecture design that provides enterprise services having human capital management functionality at the level of an enterprise application. The design includes a set of service operations, process components, and optionally deployment units. Suitable business objects are also described.

19 Claims, 26 Drawing Sheets

(56) References Cited

U.S. PATENT DOCUMENTS

| | | |
|---|---|---|
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H1830 H | 1/2000 | Petrimoulx et al. |
| 6,028,997 A | 2/2000 | Leymann et al. |
| 6,049,838 A | 4/2000 | Miller et al. |
| 6,070,197 A | 5/2000 | Cobb et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,208,345 B1 | 3/2001 | Sheard et al. |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,789,252 B1 | 9/2004 | Burke et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,448,022 B1 | 11/2008 | Ram et al. |
| 7,451,432 B2 | 11/2008 | Shukla et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,904,350 B2 | 3/2011 | Ayala et al. |
| 7,925,985 B2 | 4/2011 | Moore |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1* | 6/2002 | Uluakar et al. .............. 707/8 |
| 2002/0082892 A1 | 6/2002 | Raffel et al. |
| 2002/0103660 A1 | 8/2002 | Cramon et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |

(56) References Cited

U.S. PATENT DOCUMENTS

| | | |
|---|---|---|
| 2003/0009754 A1 | 1/2003 | Rowley et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1* | 7/2005 | Gomez et al. ............... 707/9 |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1* | 1/2006 | Phillips et al. ............... 707/101 |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1* | 6/2007 | Jeong ............................. 717/106 |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0168303 A1 | 7/2007 | Kaetker et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Kaetker et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070336 A1 | 3/2010 | Koegler et al. |

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6. 1994.

Anon.; "State of the Art Reports™ 13,000 MAS 90® for WINDOWS® Shipments in First Nine Months of Availability"; PR Newswire; Apr. 28, 1997.

Arch-int S. et al.; "Development of Industrial Information Systems on the Web Using Busienss Components"; Computers in Industry; vol, 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management: New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No.1; p. 179; Jul. 13, 2000.

Beisiegel, M. et al.; "Service Component Architecture: Building Systems Using a Service Oriented Architecture"; Whitepaper [online] Nov. 2005; pp. 1-31; http://download.boulder.ibm.com/ibmdl/pub/software/dw/specs/ws-sca/SCA_White_Paper1_09.pdf.

(56) References Cited

OTHER PUBLICATIONS

Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framewoek"; Software—Concepts & Tools; vol. 19, No. 1; 1998; pp. 29-36.
Fellner, K.J., et al.; "Classification Framework for Business Components"; Systems Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson/pdf.
Gauthier, P. and OSS-J Architecture Board; "OSS through Java (TM) J2EE Design Guidelines"; [online] Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
"Hudson's Bay Company Realizes Fast ROI with the Oracle E-Business Suite": PR Newswire; New York; Jan. 15, 2002; p. 1.
Kozacynski, W.; "Architecture Framework for Business Components"; Software Reuse 1998 Proceedings; Fifth International Conferences on Victoria, BC, Canada; Jun. 1998; IEEE Comput. Soc; pp, 300-307.
Kythe, D.K.; "The Promise or Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture, Notes in Computer Science: vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop: vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands: Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_application.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/322,041; Apr. 30, 2009; 26 pages.
Office Action issued in U.S. Appl. No. 11/322,612; May 11, 2009; 24 pages.
Office Action issued in U.S. Appl. No, 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.

(56) References Cited

OTHER PUBLICATIONS

Office Action issued in U.S. Appl. No. 11/396,288; Apr. 15, 2008; 26 pages.
Office Action issued in U.S. Appl. No. 11/397,029; Jul. 21, 2009;28 pages.
Office Action issued in U.S. Appl. No, 11/323,040; Jul. 24. 2009; 35 pages.
Office Action issued in U.S. Appl. No. 11/323,590; Jul. 10, 2009; 32 pages.
Office Action issued in U.S. Appl. No. 11/322 816; Jul. 21, 2006; 41 pages.
Office Action issued in U.S. Appl. No. 11/322,851; Sep. 2, 2009; 32 pages.
Office Action issued in U.S. Appl. No. 11/323,590; Dec. 30, 2009: 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chair Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy; The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search. Report and Written Opinion of the International Searching Authority issued in International Application No. PCT/EP2007/002841; Aug. 16, 2007; 12 pages.
International Preliminary Report on Patentability under Chapter 1 issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Application No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 16, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.

(56) References Cited

OTHER PUBLICATIONS

Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306,
Cool, David W.; "Activity Fund Accounting": School Business Affairs; vol. 49, No. 6; Jun. 1983; pp. 50-52.
SAP AG; "SAP NetWeaver Visual Composer: User Guide (SAP Net Weaver Visual Composer release 6.01)"; Document version 1.1; 1-208.
Strelich. Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Office Action issued in U.S. Appl. No. 11/322,398 on Oct. 29, 2010; 18 pages.
Notice, of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 11/396,259 on Oct. 15, 2010; 6 pages..
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Jul. 28, 2010, 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance Issued in U.S. Appl. No. 11/967,865 on Oct. 6, 2010; 6 pages.
Office Action issued in U.S. Appl. No. 11/404,147 on Nov. 24, 410; 27 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Aug. 4, 2011; 26 pages.

(56) References Cited

OTHER PUBLICATIONS

Office Action issued in U.S. Appl. No. 12/332,965 on Oct. 11, 2011; 6 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967, 483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowanced issued in U.S. Appl. No. 11/322,398 on May 27, 2011; 21 pages.
Office Action issued in U.S. Appl. No. 11/322,383 on May 12, 2010; 23 pages.
Office Action issued in U.S. Appl. No. 11/322,383 on Nov. 12, 2009; 23 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,288; Dec. 28, 2010; 4 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.

\* cited by examiner

2000

| Work Agreement | Employment | Compensation Component Type |
|---|---|---|
| *186* | *188* | *190* |

FIG. 20

PROVIDING HUMAN CAPITAL MANAGEMENT SOFTWARE APPLICATION AS ENTERPRISE SERVICES

BACKGROUND

This specification relates to data processing systems implemented on computers and, more particularly, to data processing systems providing human capital management services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a service architecture design that provides enterprise services having human capital management functionality at the level of an enterprise application. Enterprise services are web services that have an enterprise-level business value.

In its various aspects, the software architecture design can be embodied in systems, methods, and computer program products. For example, a system in one embodiment implements a services architecture design that provides enterprise services having human capital management functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIG. 20 is a block diagram of a human capital master data management process component.

DETAILED DESCRIPTION

Figure 1A:
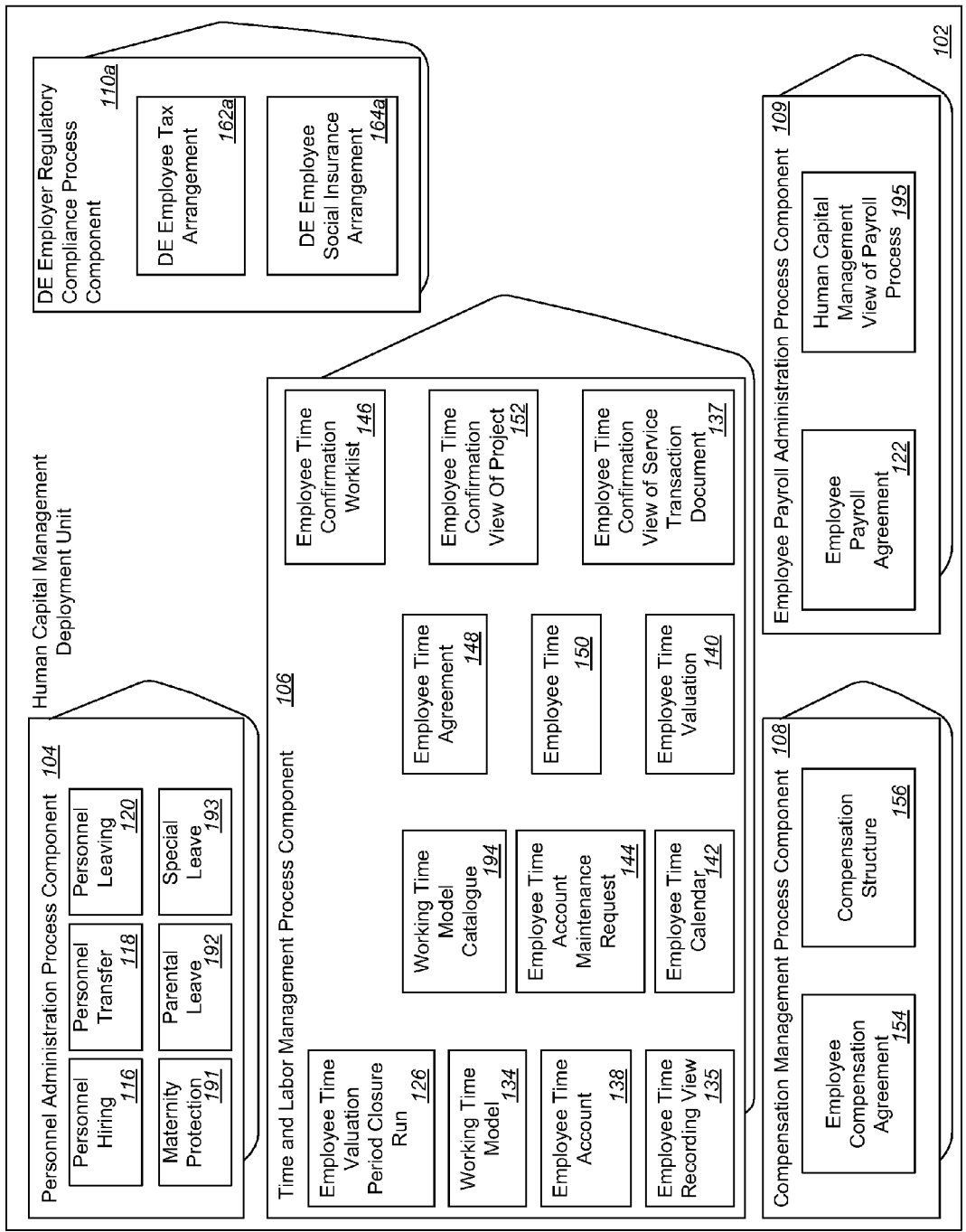
FIGS. 1A, 1B, 1C, and 1D collectively illustrate a high-level view of a software architectural design and implementation of a suite enterprise software services having human capital management functionality.
Figure 1B:
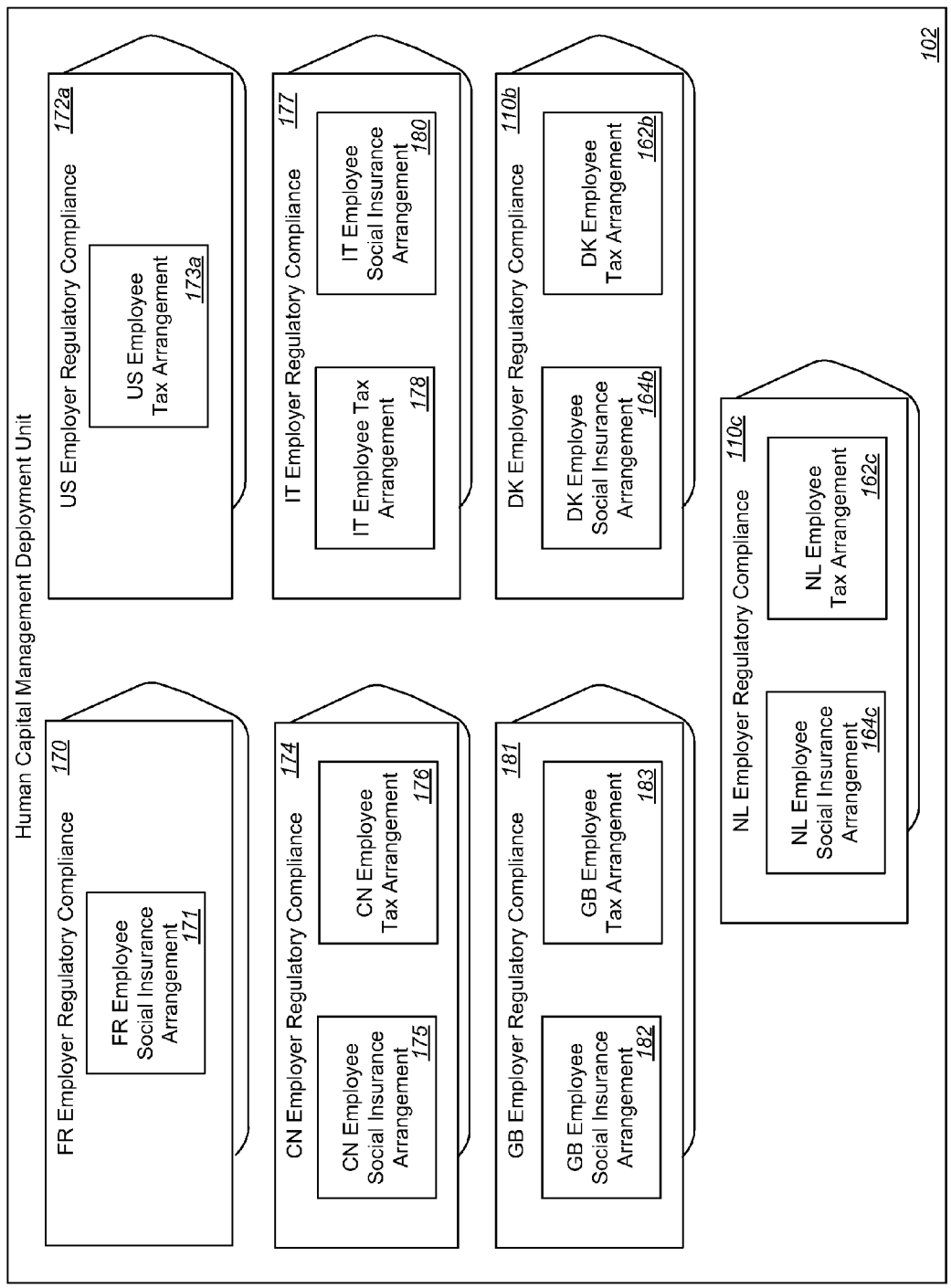
Figure 1C:
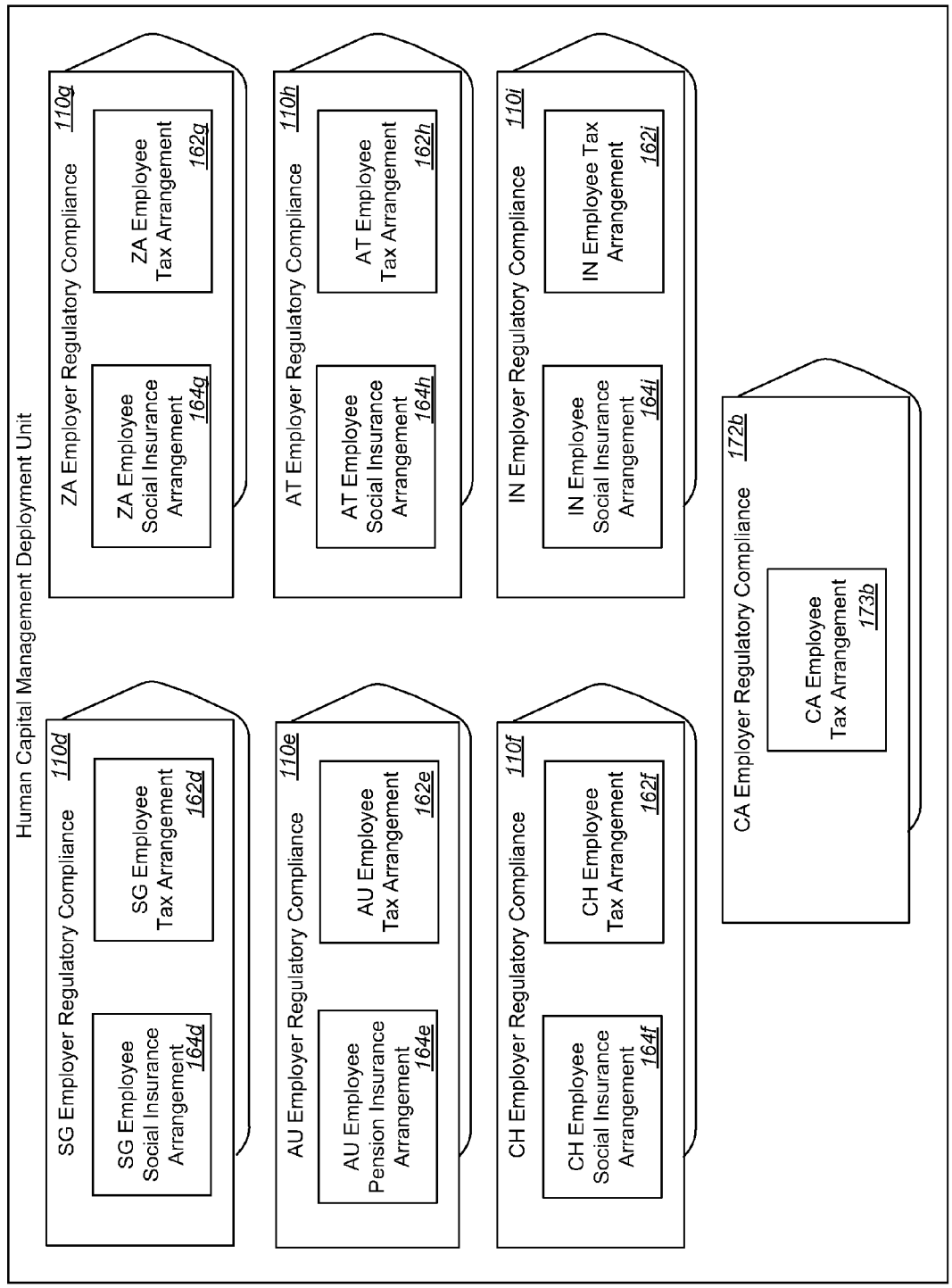
Figure 1D:
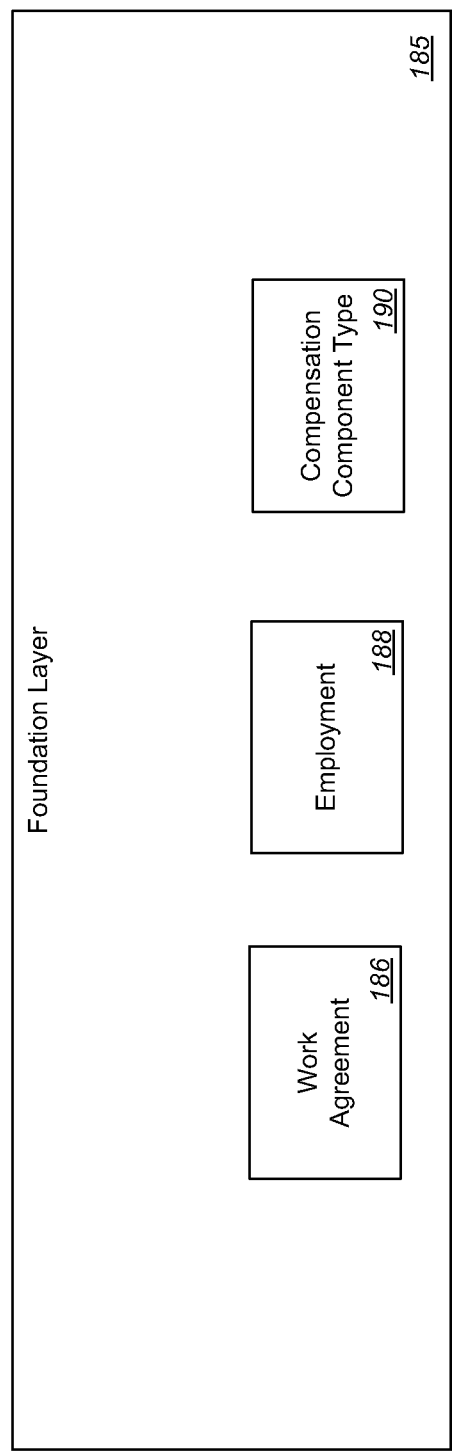

FIGS. 1A, 1B, 1C, and 1D illustrate a high-level view of a software architectural design, and of application software implementations of the design, that provides a suite of enterprise service operations, which can be organized into interfaces, having human capital management application functionality. The software corresponding to FIGS. 1A, 1B, and 1C in some implementations is for deployment in an application layer of an application server, while the software corresponding to FIG. 1D is for deployment in a foundation layer, which will be described below.

The elements of the architecture include the business object, the process component, the service operation (or simply, the operation), the service interface, the message, and the deployment unit. The elements can also include process agents and reuse service components. These will be generally described below.

In some implementations, the software is implemented to be deployed on an application platform that includes a foundation layer that contains all fundamental entities that can be used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run, and generally has a name that includes "run". An instance of a mass data run object embodies or includes a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component. Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design such a system can optionally include a repository of service descriptions that includes a standards-based description of each of the supported service operations.

The architectural elements also optionally include the service interface, which may be referred to simply as an interface. An interface is a named group of operations. Each operation belongs to exactly one interface. An interface belongs to exactly one process component. A process component might contain multiple interfaces. In some implementations, an interface will have only inbound or outbound operations, but not a mixture of both. One interface can include both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous. Asynchronous outbound process agents are called after a business object changes, e.g., after a create, update, or delete of a business object instance. Synchronous outbound process agents are generally triggered directly by a business object.

An outbound process agent will generally perform some processing of the data of the business object instance whose change triggered the agent or caused the agent to be called. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B, 1C, and 1D illustrate a high-level view of a software architectural design and implementation of a suite enterprise software services having human capital management functionality. This disclosure includes various country abbreviations to indicate a particular country involved in a description. The abbreviation-country acronyms include (AT) for Austria; (AU) for Australia; (CA) for Canada; (CN) for China; (DK) for Denmark; (FR) for France; (DE) for Germany; (IN) for India; (IT) for Italy; (NL) for the Netherlands; (SG) for Singapore; (ZA) for South Africa; (CH) for Switzerland; (GB) for the United Kingdom; and (US) for the United States.

As shown in FIG. 1A, a Human Capital Management deployment unit 102 includes a Personnel Administration process component 104, a Time and Labor Management process component 106, a Compensation Management process component 108, an Employee Payroll Administration process component 109, and one or more country-specific employer regulatory compliance process components, e.g., a DE Employer Regulatory Compliance process component 110a, an FR Employer Regulatory Compliance process component 170, a US Employer Regulatory Compliance process component 172a, a CN Employer Regulatory Compliance process component 174, an IT Employer Regulatory Compliance process component 177, a GB Employer Regulatory Compliance process component 181, a DK Employer Regulatory Compliance 110b, a NL Employer Regulatory Compliance 110c, a SG Employer Regulatory Compliance 110d, an AU Employer Regulatory Compliance 110e, a CH Employer Regulatory Compliance 110f, a ZA Employer Regulatory Compliance 110g, an AT Employer Regulatory Compliance 110h, an IN Employer Regulatory Compliance 110i, and a CA Employer Regulatory Compliance 172b.

The Personnel Administration process component 104 includes a Personnel Hiring business object 116, a Personnel Transfer business object 118, a Personnel Leaving business object 120, a Maternity Protection business object 191, a Parental Leave business object 192, and a Special Leave business object 193.

The Time and Labor Management process component 106 includes an Employee Time Valuation Period Closure Run mass data run object 126, a Working Time Model master data object 134, an Employee Time Recording View transformed object 135, an Employee Time Confirmation View of Service Transaction Document business object 137, an Employee Time Account business object 138, an Employee Time Valuation business object 140, an Employee Time Calendar business object 142, an Employee Time Account Maintenance Request business object 144, an Employee Time Confirmation Worklist business object 146, an Employee Time Agreement master data object 148, an Employee Time business object 150, an Employee Time Confirmation View of Project business object 152, and a Working Time Model Catalog business object 194.

The Compensation Management process component 108 includes an Employee Compensation Agreement master data object 154 and a Compensation Structure master data object 156.

The Employee Payroll Administration Process Component 109 includes an Employee Payroll Agreement business object 122 and a Human Capital Management View of Payroll Process business object 195.

The DE Employer Regulatory Compliance Process Component 10a includes a DE Employee Tax Arrangement master data object 162a and a DE Employee Social Insurance master data object 164a.

As shown in FIG. 1B, the FR Employer Regulatory Compliance process component 170 includes an FR Employee Social Insurance Arrangement business process data object 171.

The US Employer Regulatory Compliance process component 172a includes a US Employee Tax Arrangement business object 173a.

The CN Employer Regulatory Compliance process component 174 includes a CN Employee Social Insurance Arrangement business object 175 and a CN Employee Tax Arrangement 176 business object.

The IT Employer Regulatory Compliance process component 177 includes an IT Employee Tax Arrangement business object 178 and an IT Employee Social Insurance Arrangement business object 180.

The GB Employer Regulatory Compliance process component 181 includes a GB Employee Social Insurance Arrangement business object 182 and a GB Employee Tax Arrangement business object 183.

The DK Employer Regulatory Compliance Process Component 110b includes a DK Employee Tax Arrangement master data object 162b and a DK Employee Social Insurance Arrangement master data object 164b.

The NL Employer Regulatory Compliance Process Component 110c includes a NL Employee Tax Arrangement master data object 162c and a NL Employee Social Insurance Arrangement master data object 164c.

As shown in FIG. 1C, the SG Employer Regulatory Compliance Process Component 110d includes a SG Employee Tax Arrangement master data object 162d and a SG Employee Social Insurance Arrangement master data object 164d.

The AU Employer Regulatory Compliance Process Component 110e includes an AU Employee Tax Arrangement master data object 162e and an AU Employee Pension Insurance Arrangement master data object 164e.

The CH Employer Regulatory Compliance Process Component 110f includes a CH Employee Tax Arrangement master data object 162f and a CH Employee Social Insurance Arrangement master data object 164f.

The ZA Employer Regulatory Compliance Process Component 110g includes a ZA Employee Tax Arrangement master data object 162g and a ZA Employee Social Insurance Arrangement master data object 164g.

The AT Employer Regulatory Compliance Process Component 110h includes an AT Employee Tax Arrangement master data object 162h and an AT Employee Social Insurance Arrangement master data object 164h.

The IN Employer Regulatory Compliance Process Component 110i includes an IN Employee Tax Arrangement master data object 162i and an IN Employee Social Insurance Arrangement master data object 164i.

The CA Employer Regulatory Compliance process component 172b includes a CA Employee Tax Arrangement business object 173b.

As shown in FIG. 1D, several business objects located in the foundation layer 185 can also be included in the architectural elements. The foundation layer business objects include a Work Agreement master data object 186, an Employment master data object 188, and a Compensation Component Type master data object 190.

Figure 2:
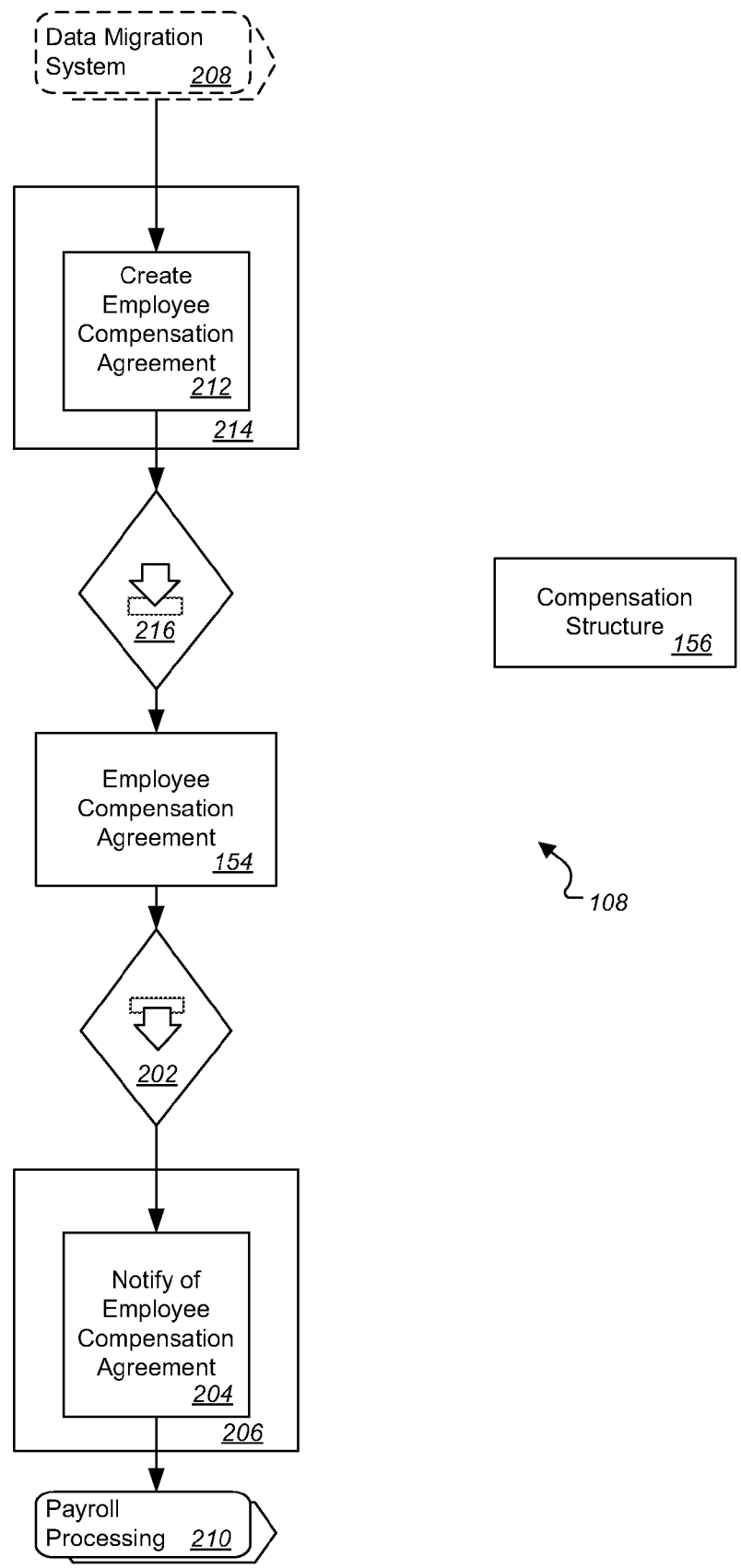
FIG. 2 is a block diagram of a compensation management process component.

FIG. 2 is a block diagram of a Compensation Management process component 108 (FIG. 1A). The Compensation Management process component 108 provides the ability for planning and specification of compensation data for employees using appropriate reward strategies, which are based on predefined compensation structures and components.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include a Data Migration System external process component 208 and a Payroll Processing process component 210.

The Compensation Management process component 108 includes the Employee Compensation Agreement master data object 154 and the Compensation Structure business object 156. The Employee Compensation Agreement master data object 154 represents an agreement between an employer and an employee detailing compensation components that are relevant to the employee, such as base salary, one-time and recurring payments, and payments for employee benefits. Additionally, part of the agreement can be an assignment of a compensation structure which shall be valid for the employee. The Compensation Structure master data object 156 represents an organized structure of pay grade ranges. A pay grade range reflects the value of tasks and activities in the company. Employees can be assigned to a pay grade range based on the tasks and activities they perform. A Compensation Structure business object 156 can be company-specific or can be predefined according to pay scale regulations.

As shown in FIG. 2, the Data Migration System external process component 208 can invoke a Create Employee Compensation Agreement operation 212. The Create Employee Compensation Agreement operation 212 is included in an Employee Compensation Agreement Migration In interface 214. The Create Employee Compensation Agreement operation 212 creates an employee compensation agreement. The Create Employee Compensation Agreement operation 212 uses an inbound process agent 216 to update the Employee Compensation Agreement master data object 154. An update in the Employee Compensation Agreement master data object 154 triggers an asynchronous outbound process agent 202. The asynchronous outbound process agent 202 invokes a Notify of Employee Compensation Agreement operation 204. The Notify of Employee Compensation Agreement operation 204 is included in an Employee Compensation Agreement in Payroll Input Maintenance Out interface 206. The Notify of Employee Compensation Agreement operation 204 sends a notification to the Payroll Processing process component 210 about the agreement between an employer and an employee detailing compensation components that are relevant to the employee.

Figure 3A:
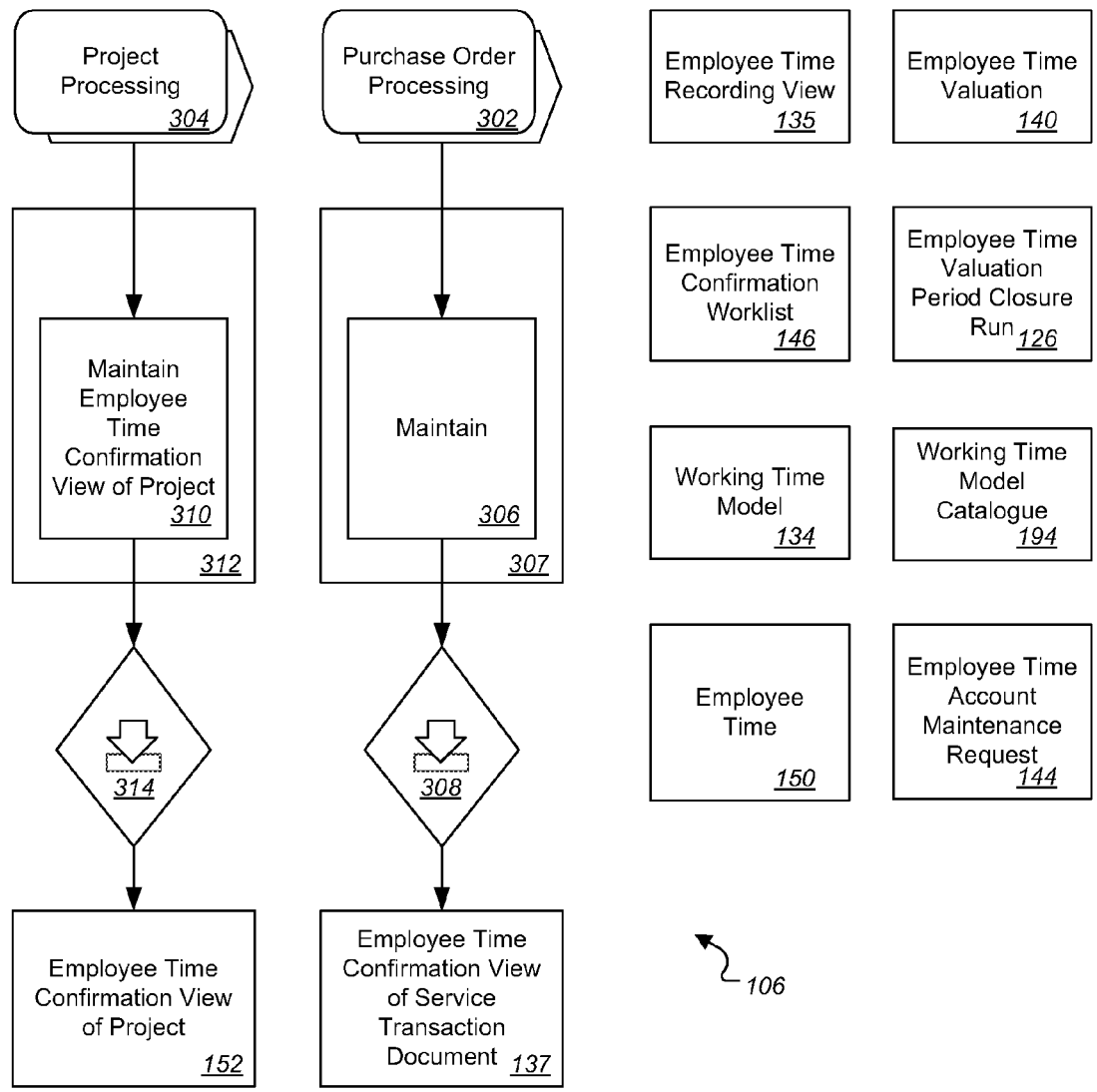
FIGS. 3A, 3B, and 3C are block diagrams collectively showing a time and labor management process component.
Figure 3B:
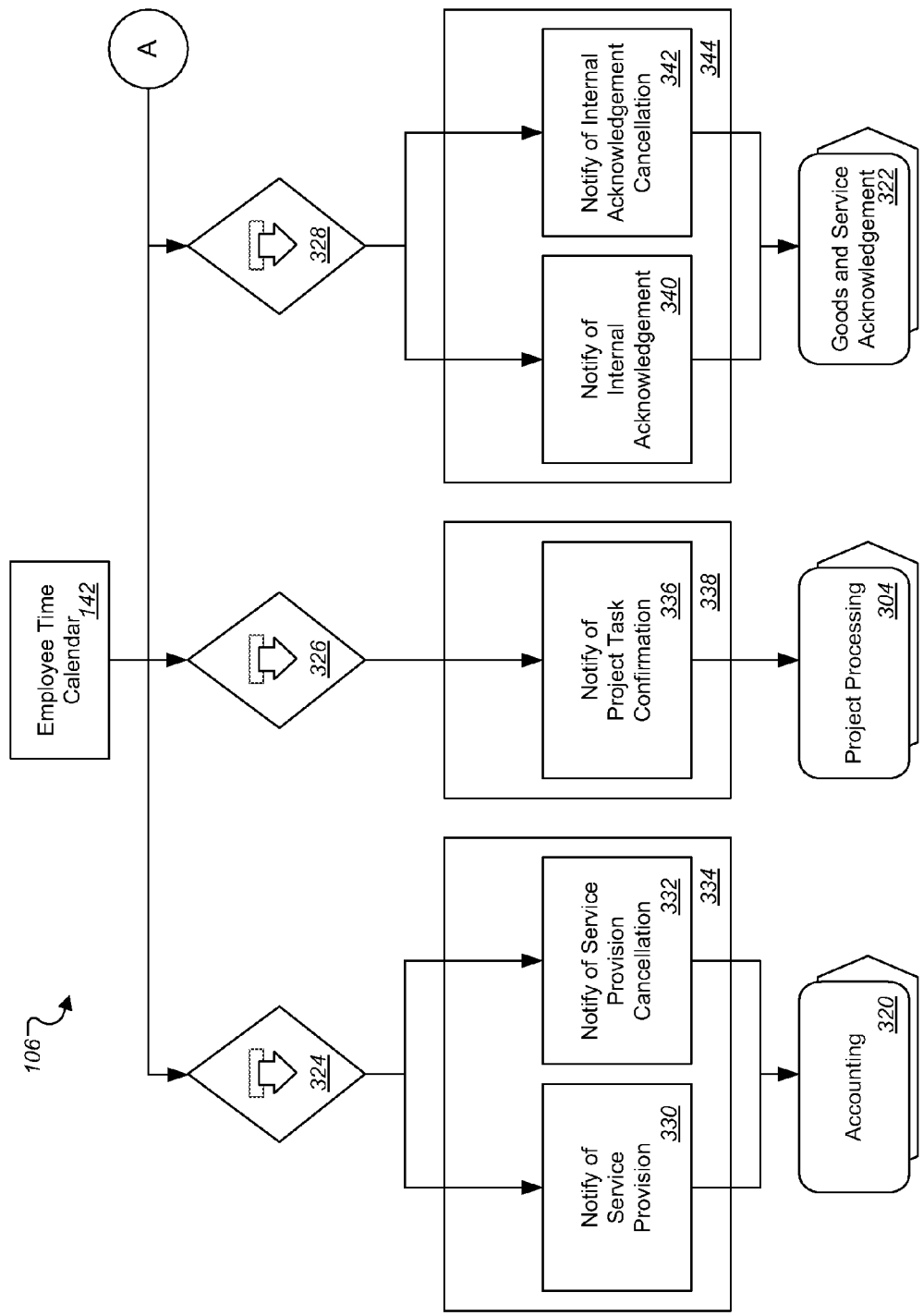
Figure 3C:
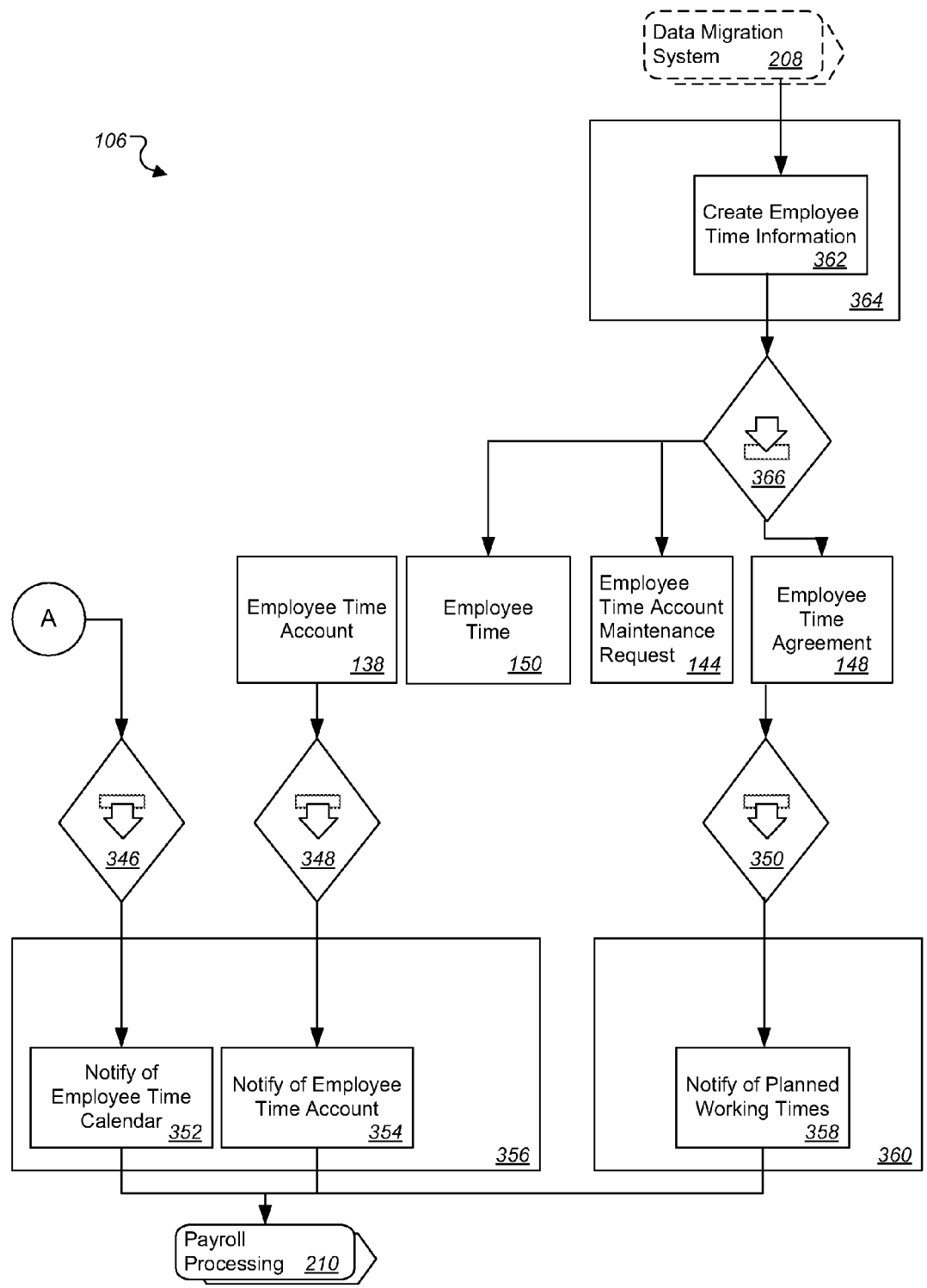

FIGS. 3A, 3B, and 3C are block diagrams collectively showing the Time and Labor Management process component 106 (FIG. 1A). The Time and Labor Management process component 106 provides for the management of employees' planned working times and the recording and valuation of work performed, as well as absence times. For convenience in describing this process component, a number of other process components are shown in the figures; these other process components are not part of the process component 106. These other process components are a Purchase Order Processing process component 302, a Project Processing process component 304, an Accounting process component 320, a Goods and Service Acknowledgement process component 322, the Data Migration System external process component 208 and the Payroll Processing process component 210. These other process components are used to represent software external to the process component in describing its interactions with the external software; however, while the external software can be implemented as such process components, this is not required.

The Time and Labor Management process component 106 includes an Employee Time Confirmation View of Service Transaction Document business object 137 and an Employee Time Confirmation View of Project business object 152. The Employee Time Confirmation View of Service Transaction Document business object 137 represents a view on a business transaction document specifying a sold or purchased service that is relevant for employee time confirmation. The Employee Time Confirmation View of Service Transaction Document business object 137 represent a view of a business transaction document specifying sold or purchased services that are relevant for employee time confirmations. The Employee Time Confirmation View of Project business object 152 represents a view on a project containing those project tasks for which employee times are confirmed.

As shown in FIG. 3A, the Purchase Order Processing process component 302 can invoke a Maintain operation 306. The Maintain operation 306 creates, changes, or deletes an employee time confirmation view of service transaction document. The operation 306 is included in an Employee Time Confirmation View of Service Transaction Document Management In interface 307. The Maintain operation 306 uses an inbound process agent 308 to update the Employee Time Confirmation View of Service Transaction Document business object 137.

The Project Processing process component 304 can invoke a Maintain Employee Time Confirmation View of Project operation 310. The Maintain Employee Time Confirmation View of Project operation 310 is included in a Project Task Confirmation In interface 312. The Maintain Employee Time Confirmation View of Project operation 310 updates the employee time confirmation view of project based on changes of a Project business object in the Project Processing process component 304. The Maintain Employee Time Confirmation View of Project operation 310 can use an inbound process agent 314 to update the Employee Time Confirmation View of Project business object 152.

The Time and Labor Management process component 106 includes the Employee Time Valuation Period Closure Run mass data run object 126. The Employee Time Valuation Period Closure Run mass data run object 126 is an automatic run for creating period closure dates in employee time valuations of selected employees.

The Time and Labor Management process component 106 also includes the Working Time Model master data object 134 and the Employee Time Recording View transformed object 135. The Working Time Model master data object 134 is an employee-independent, structured description of working times. In addition to working times, it can also describe absence times, break times, and availability times. The Employee Time Recording View transformed object 135 is a view of several times of one employee for recording purposes. The Time and Labor Management process component 106 also includes the Employee Time Valuation business object 140, the Employee Time Account Maintenance Request business object 144, the Employee Time Confirmation Worklist business object 146, and the Employee Time business object 150. The Employee Time Valuation business object 140 represents the object responsible for the execution of valuation of employee times and other time management documents, such as employee time account maintenance requests, for one internal or external employee. The Employee Time Account Maintenance Request business object 144 represents a request to create, modify, or cancel an employee time account. The Employee Time Account Maintenance Request business object 144 can request an increase or reduction of the times of one employee time account, a transfer of times from one employee time account to another, a payout of times, or a creation or cancellation of an employee time account. When valuating the request, the system creates new line items in employee time accounts.

The Employee Time Confirmation Worklist business object 146 represents a list of work items that are assigned to an employee and that are to be used to confirm the employee times. An employee time is a document concerning the planned and actual working times of an internal or external employee of the company. The work items can include project processing or accounting information, but typically does not include the actual times. The Employee Time business object 150 represents a recorded document of the working times of an internal or external employee. In addition to planned and actual working times and activities carried out for the company, the Employee Time business object 150 may also document absence times, break times, and availability times. The Working Time Model Catalog business object 194 is a structured directory of the available working time models. The availability can be restricted to parts of the organization for individual parts of the catalog.

As shown in FIG. 3B, the Time and Labor Management process component 106 includes the Employee Time Calendar business object 142. The Employee Time Calendar business object 142 represents a read only calendar representation of the time valuation results determined by time evaluation from recorded time documents for an employee. The Employee Time Calendar business object 142 can send notifications to a number of process components including the Accounting process component 320, the Project Processing process component 304, and the Goods and Service Acknowledgement process component 322.

An update in the Employee Time Calendar business object 142 triggers an outbound process agent 324, an outbound process agent 326, or an outbound process agent 328. If the outbound process agent 324 is triggered, either a Notify of Service Provision operation 330 or a Notify of Service Provision Cancellation operation 332 is invoked. Both operations 330, and 332 are included in a Service Provision Accounting Out interface 334. The Notify of Service Provision operation 330 notifies the Accounting process component 320 of actual service provided and actual time spent on performing the service. The Notify of Service Provision Cancellation operation 332 notifies the Accounting process component 320 that a provided service has been cancelled. This notification is sent when an active employee time that contains information relevant for accounting is cancelled.

If the outbound process agent 326 is triggered a Notify of Project Task Confirmation operation 336 is invoked. The Notify of Project Task Confirmation operation 336 is included in a Project Task Confirmation Out interface 338. The Notify of Project Task Confirmation operation 336 notifies the Project Processing process component 304 of a project task confirmation or a project task status change. This notification is sent when an active employee time with project relevant information is created, changed, or cancelled in an active employee time.

If the outbound process agent 328 is triggered, either a Notify of Internal Acknowledgement operation 340 or a Notify of Internal Acknowledgement Cancellation operation 342 is invoked. Both operations 340 and 342 are included in an Internal Acknowledgement Out interface 344. The Notify of Internal Acknowledgement operation 340 notifies the Goods and Service Acknowledgement process component 322 of a service provided by an external employee. This notification is sent when an active employee time with goods and service acknowledgement relevant information is created, changed, or cancelled. The Notify of Internal Acknowledgement Cancellation operation 342 notifies the Goods and Service Acknowledgement process component 322 of the cancellation of an externally provided service. This cancellation is sent when an active employee time with goods and service acknowledgement relevant information is cancelled.

As shown in FIG. 3C, the Time and Labor Management process component 106 includes the Employee Time Account business object 138 and the Employee Time Agreement master data object 148. The Employee Time Account business object 138 is a summary of valuated employee times and of periodic valuations administered by employee time valuation. The Employee Time Agreement master data object 148 is an agreement between employer and employee consisting of time management stipulations that are derived from legal, company-specific, and pay-related provisions, and from terms agreed individually with the employee.

An update in the Employee Time Calendar business object 142 triggers an outbound process agent 346 to invoke a Notify of Employee Time Calendar operation 352. The operation 352 sends a notification to the Payroll Processing process component 210 regarding changes to an employee time calendar. The Notify of Employee Time Calendar operation 352 is included in an Employee Time Calendar and Account in Payroll Input Maintenance Out interface 356.

An update in the Employee Time Account business object 138 triggers an outbound process agent 348 to invoke a Notify of Employee Time Account operation 354. The operation 354 is included in the Employee Time Calendar and Account in Payroll Input Maintenance Out interface 356. The Notify of Employee Time Account operation 354 sends a notification to the Payroll Processing process component 210 regarding changes to an employee time account.

The Data Migration System external process component 208 can invoke a Create Employee Time Information operation 362. The Create Employee Time Information operation 362 is included in an Employee Time Information Migration In interface 364. The Create Employee Time Information operation 362 converts information about an employee's time data that is to be migrated from a legacy system to the Time and Labor Management process component 106. The Create Employee Time Information operation 362 uses an inbound process agent 366 to update the Employee Time Agreement master data object 148 or an Employee Time business object 150 or an Employee Time Account Maintenance Request business object 144. An update in the Employee Time Agreement master data object 148 triggers an asynchronous outbound process agent 350 to invoke a Notify of Planned Working Times operation 358 that notifies the country-specific Employee Payroll Input business object about planned working times. The operation 358 is included in an Employee Time Agreement in Payroll Input Maintenance Out interface 360. The Notify of Planned Working Times operation 358 sends a notification to the Payroll Processing process component 210 regarding planned working times.

Figure 4:
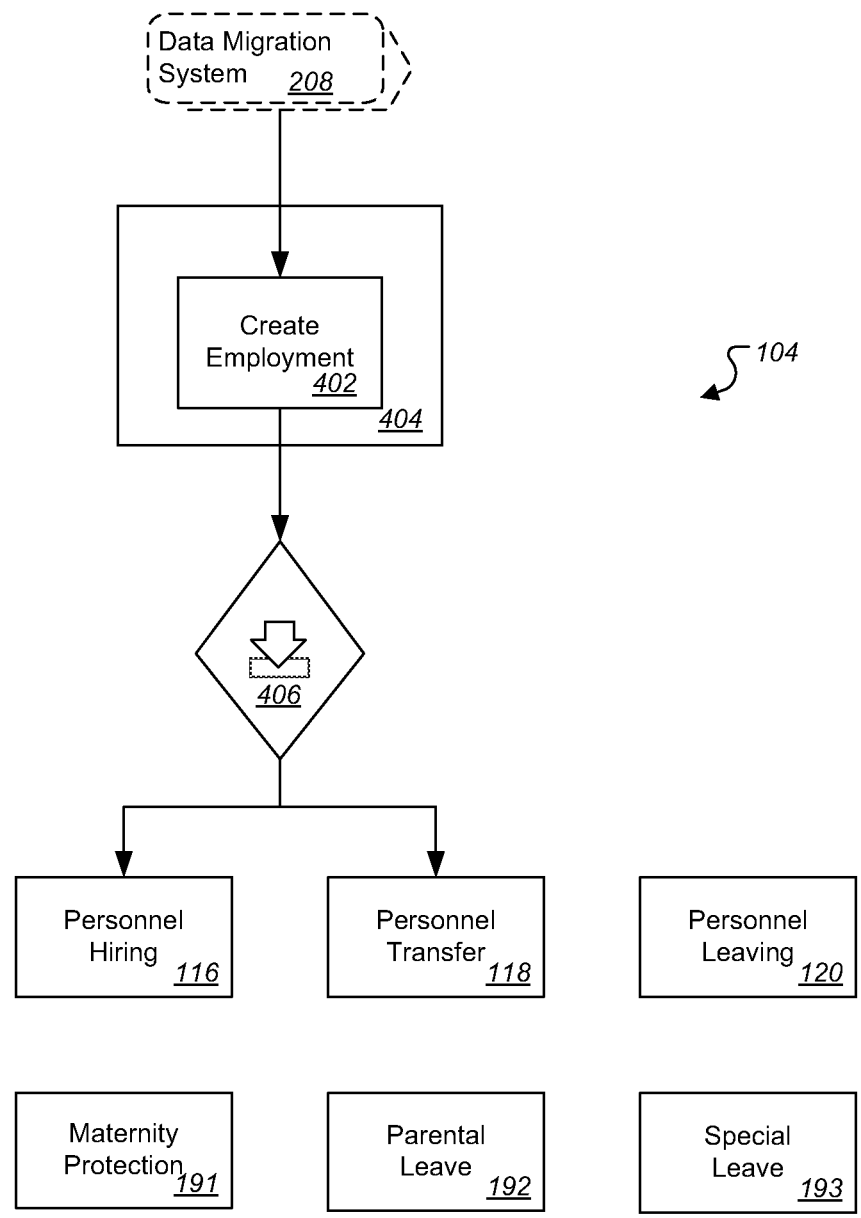
FIG. 4 is a block diagram of a personnel administration process component.

FIG. 4 is a block diagram of the Personnel Administration process component 104 (FIG. 1). The Personnel Administration process component 104 manages the administration of personnel changes concerning employee master data and work agreements. The Personnel Administration process component 104 includes the Personnel Hiring business object 116, the Personnel Transfer business object 118, the Personnel Leaving business object 120, the Maternity Protection business object 191, the Parental Leave business object 192, and the Special Leave business object 193. The Personnel Hiring business object 116 represents a first hiring, rehiring, or creation of another work agreement of an employee. The Personnel Transfer business object 118 represents an organizational reassignment of an employee within the company. The Personnel Leaving business object 120 represents a termination of a work agreement of an employee. The Maternity Protection business object 191 represents a leave of absence of a female employee provided for under national regulations in relation to the birth of a child. The Parental Leave business object 192 represents a leave of absence of an employee as specified by the national laws and regulations in relation to time off work to care for a child. The Special Leave business object 193 represents an absence from work due to exceptional circumstances, either at the request of the employee or in accordance with country-specific legal regulations.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208.

The Data Migration System external process component 208 can invoke a Create Employment operation 402. The Create Employment operation 402 is included in an Employment Migration In 404. The Create Employee Time Information operation 362 converts information about an Employment which is to be migrated from a legacy system into employment. The Create Employment operation 402 uses an inbound process agent 406 to update the Personnel Hiring business object 116 or the Personnel Transfer business object 118.

Figure 5:
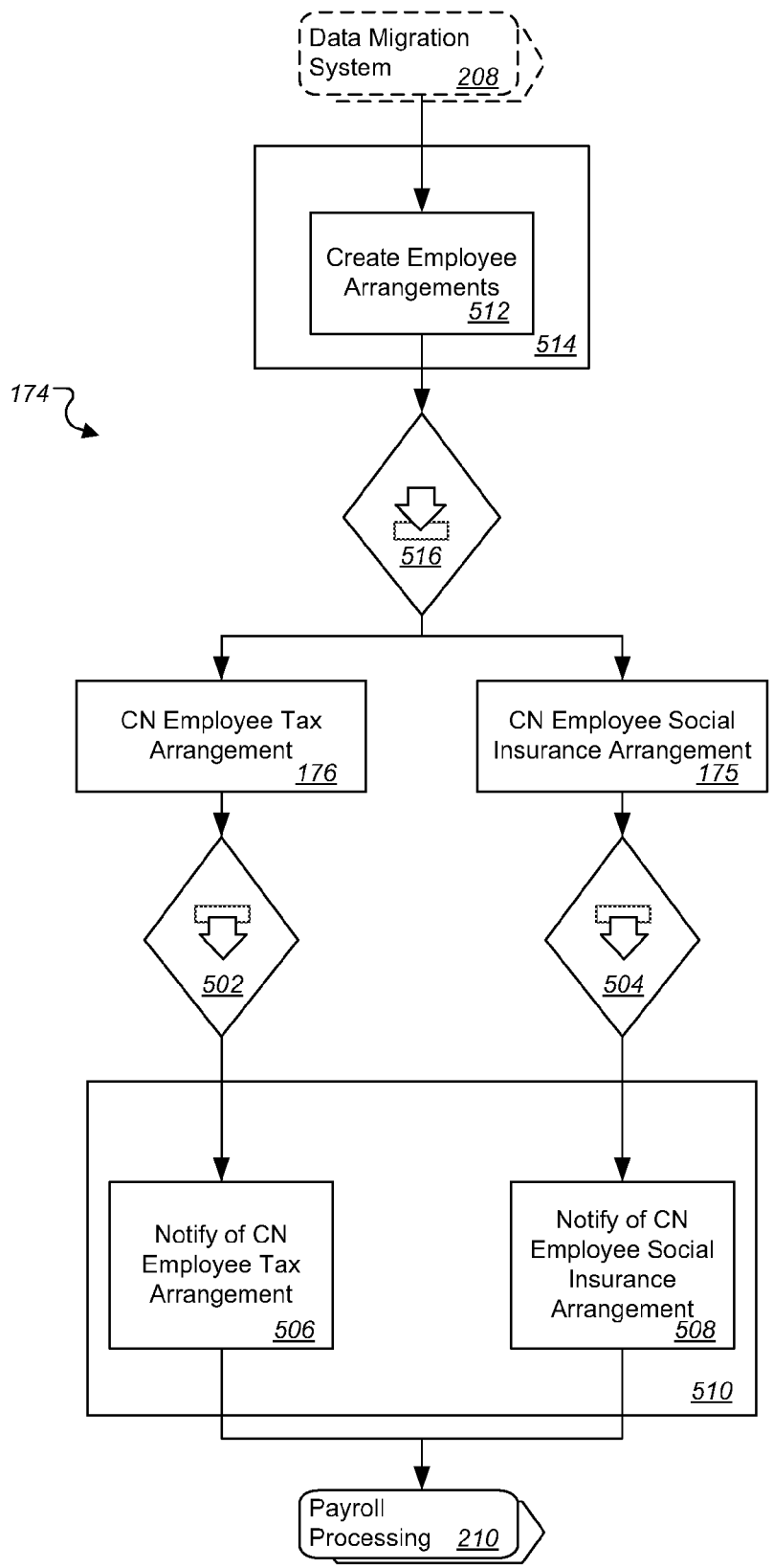
FIG. 5 is a block diagram of a CN employer regulatory compliance process component.

FIG. 5 is a block diagram of the CN Employer Regulatory Compliance process component 174 (FIG. 1B). The CN Employer Regulatory Compliance process component 174 stores the combination of all reporting and other administrative activities that employers in China, with respect to employees, are legally obligated to perform.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The CN Employer Regulatory Compliance process component 174 includes the CN Employee Tax Arrangement business object 176 and the CN Employee Social Insurance Arrangement business object 175. The CN Employee Tax Arrangement business object 176 represents the arrangement between the employee and the tax authorities of the People's Republic of China that defines the rules of how the employer must calculate and report taxes for this employee to be compliant with the legal requirements of the People's Republic of China. The CN Employee Tax Arrangement business object 176 contains information recorded from the tax card supplied to the employee (e.g., tax ID, tax area and employee tax type) and supplementary details (e.g., indicator for a tax agreement, indicator for tax paid by employer and indicator for tax exempted). The CN Employee Social Insurance Arrangement business object 175 represents the arrangement for the employee by the Chinese bodies that are legally responsible for administering the employee's social insurance contributions and benefits. This arrangement concerns the information required for calculation of Chinese social insurance contributions and reporting according to the Chinese Social Insurance authorities. The CN Employee Social Insurance Arrangement business object 175 contains information required for the different types of social insurance contributions (e.g., pension insurance, unemployment insurance, on the job injury insurance, maternity insurance, public housing fund, and medical care insurance) to various public and private insurance bodies.

The Data Migration System external process component 208 can invoke a Create Employee Arrangements operation 512. The Create Employee Arrangements operation 512 is included in an Employee Migration In interface 514. The Create Employee Arrangements operation 512 creates business objects for employee arrangements. The Create Employee Arrangements operation 512 triggers an inbound process agent 516 to update the CN Employee Tax Arrangement business object 176 or the CN Employee Social Insurance Arrangement business object 175. An update in the CN Employee Tax Arrangement business object 176 triggers an outbound process agent 502 to invoke a Notify of CN Employee Tax Arrangement operation 506. The operation 506 is included in a CN Employer Regulatory Compliance in Payroll Input Maintenance Out interface 510. The Notify of CN Employee Tax Arrangement operation 506 sends a notification to the Payroll Processing process component 210 regarding new or changed tax data for a Chinese employee.

An update in the CN Employee Social Insurance Arrangement business object 175 triggers an asynchronous outbound process agent 504 to invoke a Notify of CN Employee Social Insurance Arrangement operation 508. The operation 508 is included in the CN Employer Regulatory Compliance in Payroll Input Maintenance Out interface 510. The Notify of CN Employee Social Insurance Arrangement operation 508 sends a notification to the Payroll Processing process component 210 regarding new or changed social insurance data for a Chinese employee.

Figure 6:
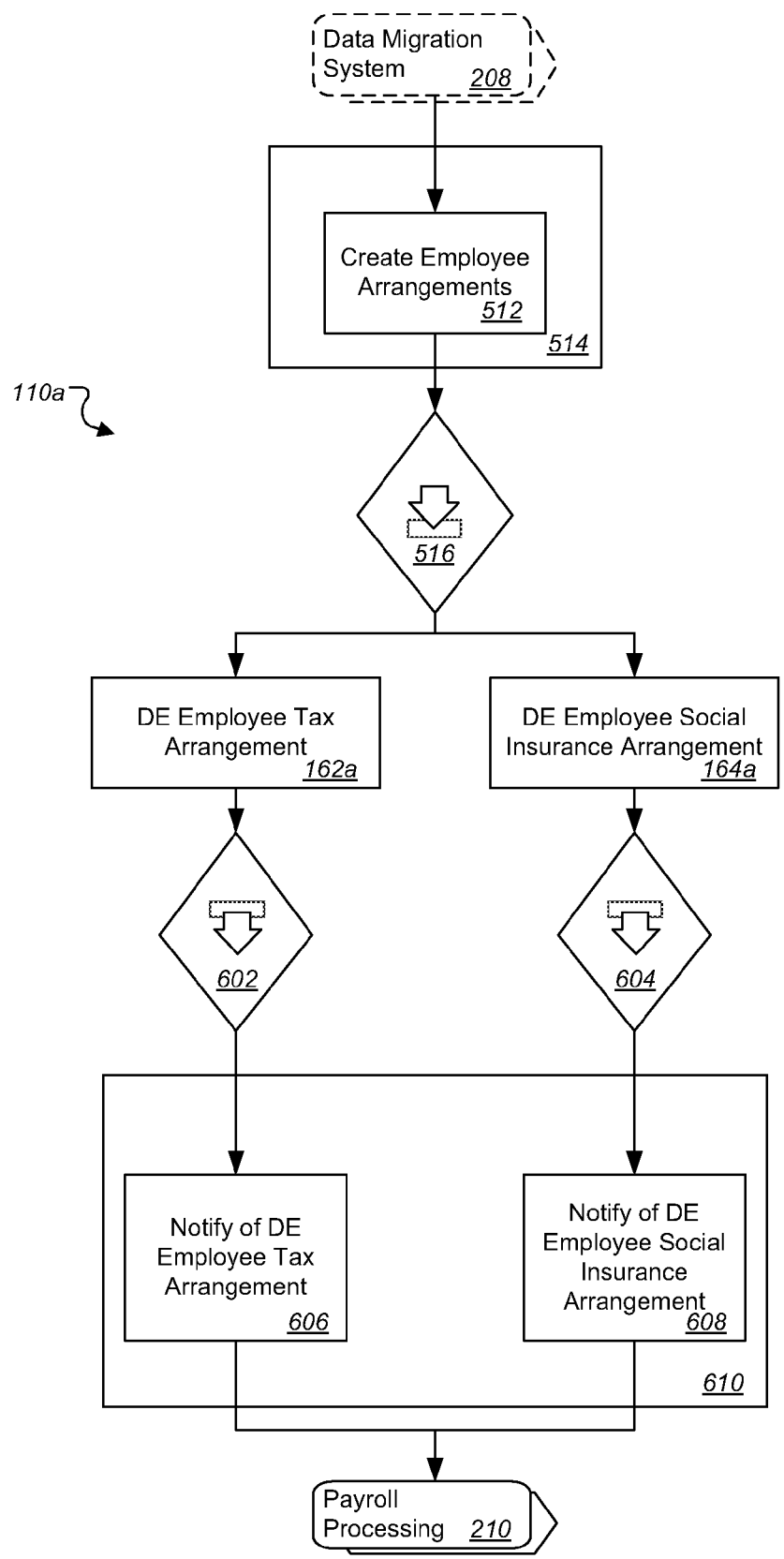
FIG. 6 is a block diagram of a DE employer regulatory compliance process component.

FIG. 6 is a block diagram of the DE Employer Regulatory Compliance process component 110*a* (FIG. 1A). The DE Employer Regulatory Compliance process component 110*a* represents the administration of employee data and reporting to authorities that employers in Germany are legally obligated to perform.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The DE Employer Regulatory Compliance process component 110*a* includes the DE Employee Tax Arrangement master data object 162*a* and the DE Employee Social Insurance Arrangement master data object 164*a*. The DE Employee Tax Arrangement master data object 162*a* represents the arrangement by the German tax authority for the employee, concerning calculation and reporting of income tax deductions according to German legal requirements. The DE Employee Tax Arrangement master data object 162*a* contains parameters recorded from the tax card supplied to the employee (e.g., tax authority, tax class, number of child tax exemptions), supplementary details (e.g., tax table to be used, special rules) and details from previous employments in the current tax year that are relevant for year-to-date amounts. The DE Employee Social Insurance Arrangement master data object 164*a* represents the arrangement for the employee by the German bodies that are legally responsible for administering the employee's social insurance contributions and benefits. This arrangement concerns the information required for calculation of German social insurance contributions and reporting according to the German data entry and transfer regulation ("DEUEV"). The DE Employee Social Insurance Arrangement master data object 164*a* contains parameters required for the different types of social insurance contributions (e.g., health insurance, pension insurance, unemployment insurance, and nursing insurance) to various public and private insurance bodies.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the DE Employee Tax Arrangement business object 162*a* or the DE Employee Social Insurance Arrangement business object 162*a*. An update in the DE Employee Tax Arrangement master data object 162*a* triggers an asynchronous outbound process agent 602 to invoke a Notify of DE Employee Tax Arrangement operation 606. The operation 606 is included in a DE Employer Regulatory Compliance in Payroll Input Maintenance Out interface 610. The Notify of DE Employee Tax Arrangement operation 606 sends a notification to the Payroll Processing process component 210 regarding new or changed tax data for a German employee tax arrangement.

An update in the DE Employee Social Insurance Arrangement master data object 164*a* triggers an asynchronous outbound process agent 604 to invoke a Notify of DE Employee Social Insurance Arrangement operation 608. The operation 608 is included in the DE Employer Regulatory Compliance in Payroll Input Maintenance Out interface 610. The Notify of DE Employee Social Insurance Arrangement operation 608 sends a notification to the Payroll Processing process component 210 regarding new or changed social insurance data for a German employee.

Figure 7:
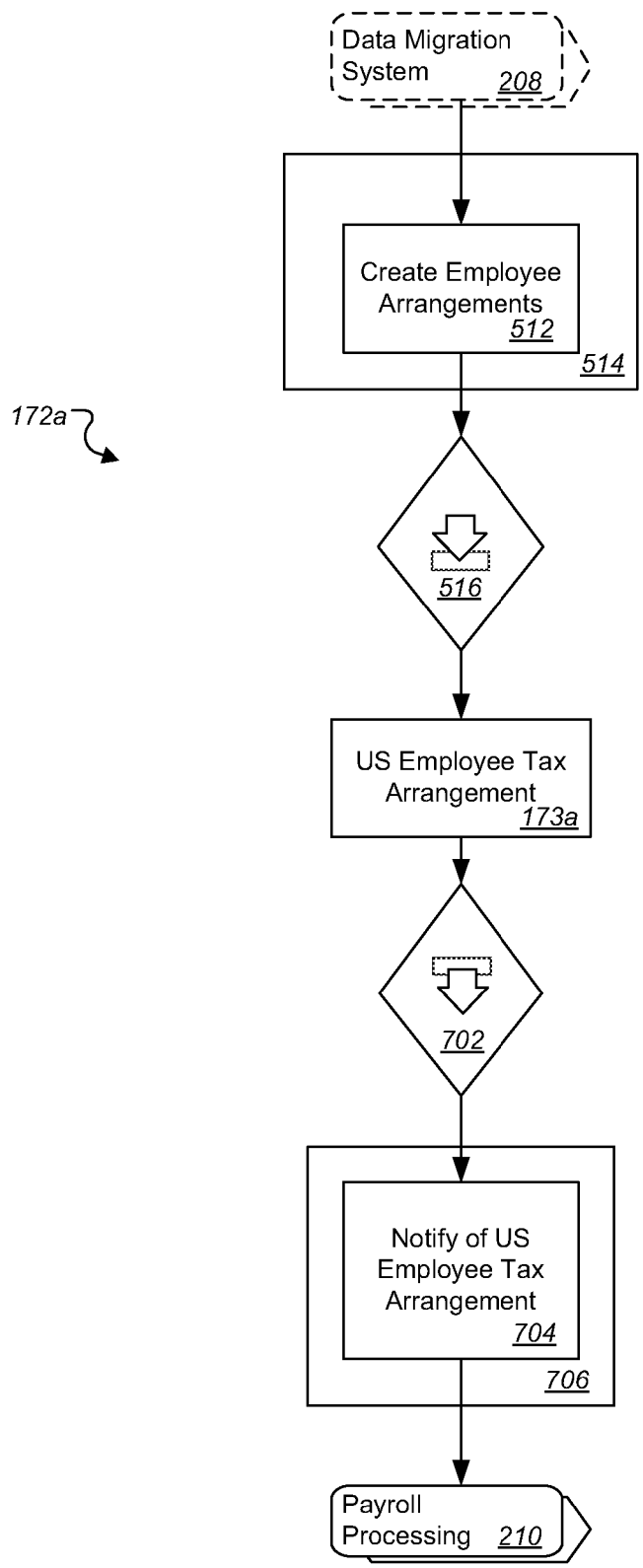
FIG. 7 is a block diagram of a US employer regulatory compliance process component.

FIG. 7 is a block diagram of the US Employer Regulatory Compliance process component 172*a* (FIG. 1B). The US Employer Regulatory Compliance process component 172*a* handles the administration of employee data and reporting to authorities that employers in the United States of America are legally obligated to perform.

For convenience in describing this process component, a number of other process components are shown in the figure;

these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The US Employer Regulatory Compliance process component 172a includes the US Employee Tax Arrangement business object 173a. The US Employee Tax Arrangement business object 173a represents the definitions of parameters for an employee that are needed for calculation and reporting of withholding tax deductions according to US federal, state, and local legal requirements. The US Employee Tax Arrangement business object 173a contains parameters for the different withholding tax jurisdictions including any information submitted by the employee (e.g., federal Form W-4, state Form W-4). This also records information on any exemptions from specific components of taxation (e.g., FICA, FUTA). Additionally, information required for calculation of state unemployment insurance tax is recorded within the US Employee Tax Arrangement master data object 173a.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the US Employee Tax Arrangement business object 173a. An update in the US Employee Tax Arrangement business object 173a triggers an outbound process agent 702 to invoke a Notify of US Employee Tax Arrangement operation 704. The operation 704 is included in a US Employer Regulatory Compliance in Payroll Input Maintenance Out interface 706. The Notify of US Employee Tax Arrangement operation 704 sends a notification to the Payroll Processing process component 210 regarding new or changed tax data for an American employee.

Figure 8:
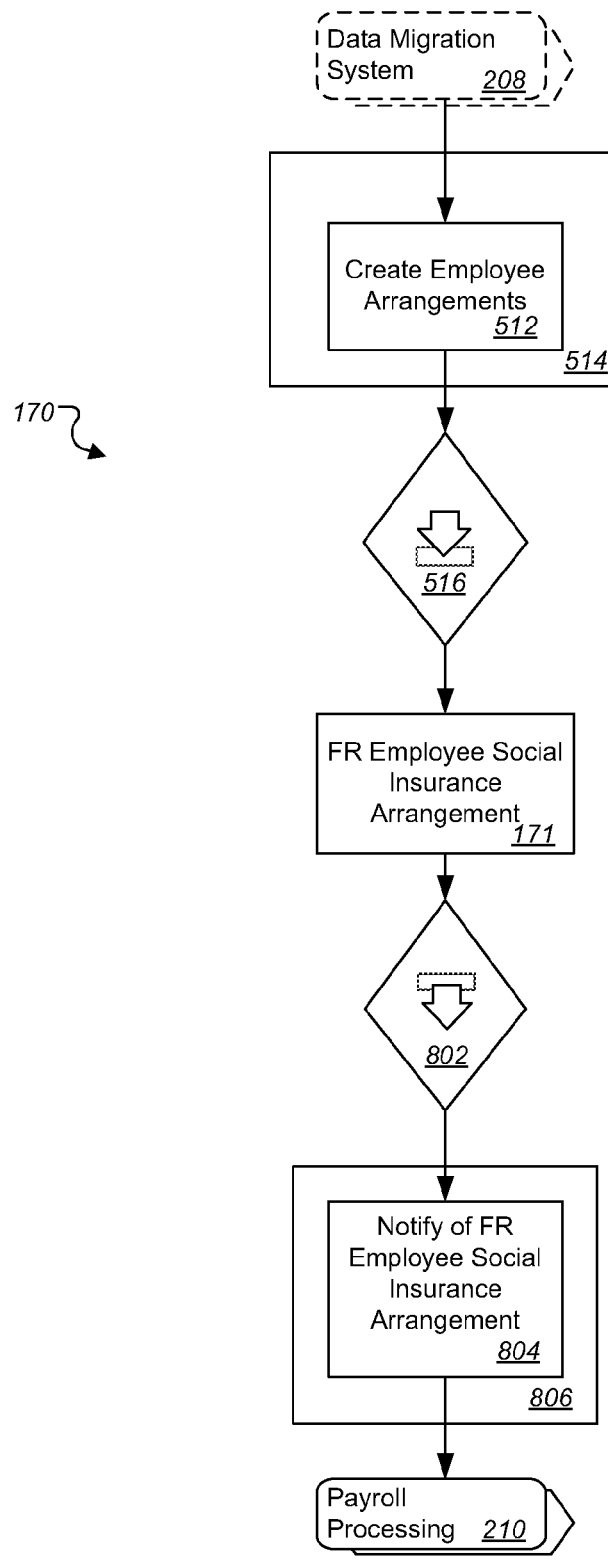
FIG. 8 is a block diagram of an FR employer regulatory compliance process component.

FIG. 8 is a block diagram of the FR Employer Regulatory Compliance process component 170 (FIG. 1B). The FR Employer Regulatory Compliance process component 170 represents the administration of employee data and reporting to authorities that employers in France are legally obligated to perform.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The FR Employer Regulatory Compliance process component 170 includes the FR Employee Social Insurance Arrangement business object 171. The FR Employee Social Insurance Arrangement master data object 171 is the arrangement for the employee by all responsible French bodies that are legally responsible for administering the employee's social insurance contributions. This arrangement concerns the information required for calculation of French social insurance contributions and reporting according to the French legal requirements. The FR Employee Social Insurance Arrangement master data object 171 contains information required for the different types of social insurance contributions (e.g., health insurance, pension insurance, unemployment insurance, and disability insurance) to various public and private bodies. This information depends of the jurisdictions of these bodies (e.g., state, region, several regions). The FR Employee Social Insurance Arrangement master data object 171 contains the list of the social insurance contributions and to which body it must be paid. These bodies include state health insurance (URSSAF), state unemployment insurance (ASSEDIC), public and private pension insurance providers and other public or private insurance providers, and each body has his corresponding jurisdiction.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the FR Employee Social Insurance Arrangement master data object 171. An update in the FR Employee Social Insurance Arrangement master data object 171 triggers an asynchronous outbound process agent 802. The asynchronous outbound process agent 802 calls a Notify of FR Employee Social Insurance Arrangement operation 804 included in a FR Employer Regulatory Compliance in Payroll Input Maintenance Out interface 806. The Notify of FR Employee Social Insurance Arrangement operation 804 sends a notification to the Payroll Processing process component 210 regarding new or changed social insurance data for a French employee.

Figure 9:
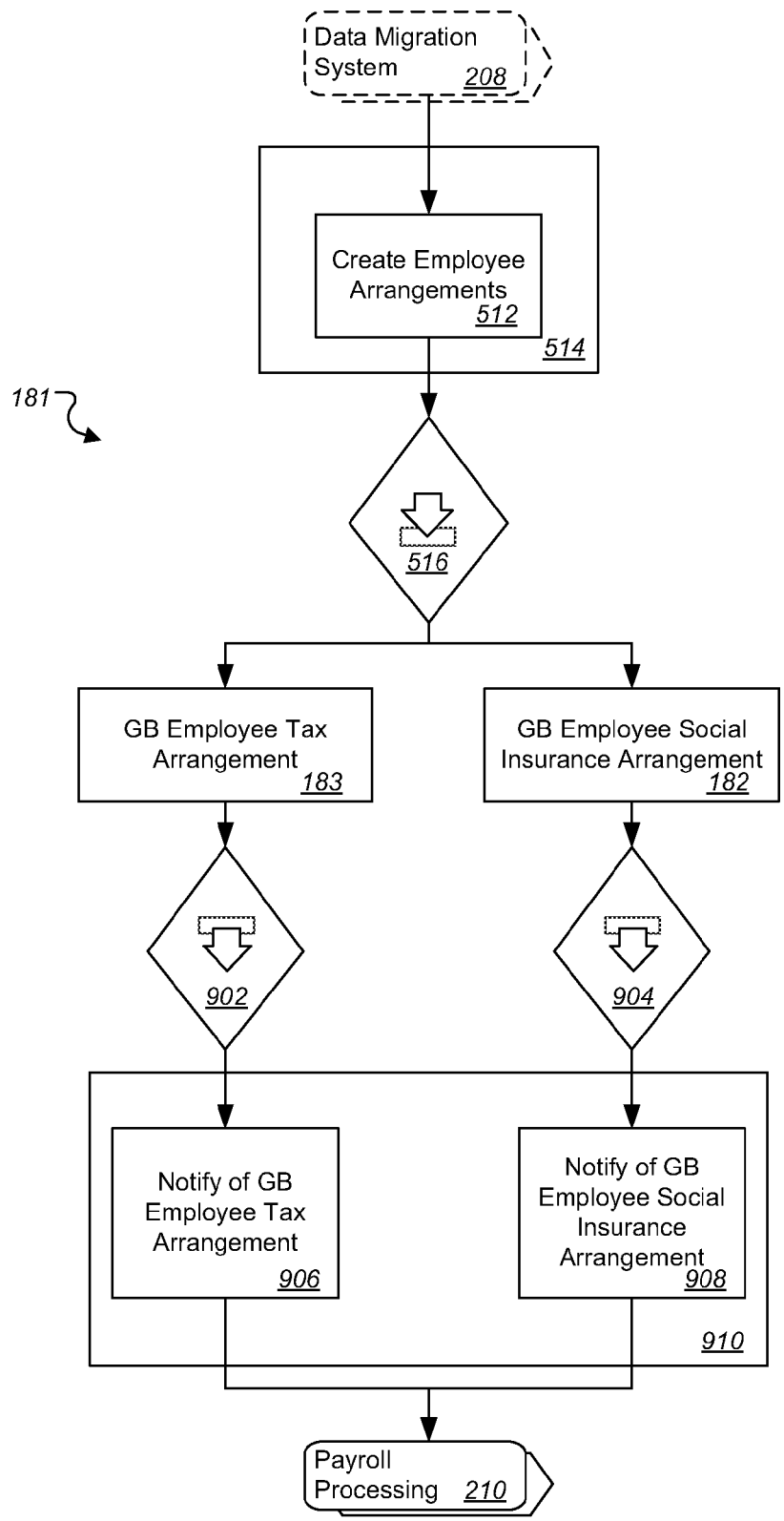
FIG. 9 is a block diagram of a GB employer regulatory compliance process component.

FIG. 9 is a block diagram of the GB Employer Regulatory Compliance process component 181 (FIG. 1B). The GB Employer Regulatory Compliance process component 181 represents the administration of employee data and reporting to authorities that employers in the United Kingdom are legally obligated to perform.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The GB Employer Regulatory Compliance process component 181 includes the GB Employee Tax Arrangement business object 183 and the GB Employee Social Insurance Arrangement business object 182. The GB Employee Tax Arrangement business object 183 represents an arrangement by the United Kingdom tax authority for the employee concerning calculation and reporting of income tax deductions according to United Kingdom legal requirements. The GB Employee Tax Arrangement business object 183 contains information recorded from the tax card supplied to the employee (e.g., tax code, tax basis), supplementary details (e.g., indicator of refunds withheld) and details from previous employments in the current tax year that are relevant for year-to-date amounts. The GB Employee Social Insurance Arrangement business object 182 represents an arrangement for the employee by United Kingdom social insurance authority concerning calculation and reporting of contributions according to the United Kingdom legal requirements. The GB Employee Social Insurance Arrangement business object 182 contains information of category, certificate held indicator and company director indicators required for social insurance contributions to Her Majesty's Revenue and Customs (HMRC).

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 triggers the inbound process agent 516 to update the GB Employee Tax Arrangement business object 183 or the GB Employee Social Insurance Arrangement business object 182. An update in the GB Employee Tax Arrangement business object 183 triggers an asynchronous outbound process agent 902 to invoke a Notify of GB Employee Tax Arrangement operation 906. The operation 906 is included in a GB Employer Regulatory Compliance in a Payroll Input Maintenance Out interface 910. The Notify of GB Employee Tax Arrangement operation 906 sends a notification to the Payroll Processing process component 210 regarding new or changed tax data for a British employee.

An update in the GB Employee Social Insurance Arrangement business object 182 triggers an asynchronous outbound process agent 904 to invoke a Notify of GB Employee Social Insurance Arrangement operation 908. The operation 908 is included in the GB Employer Regulatory Compliance in Payroll Input Maintenance Out interface 910. The Notify of GB Employee Social Insurance Arrangement operation 908 sends a notification to the Payroll Processing process component 210 regarding new or changed social insurance data for a British employee.

Figure 10:
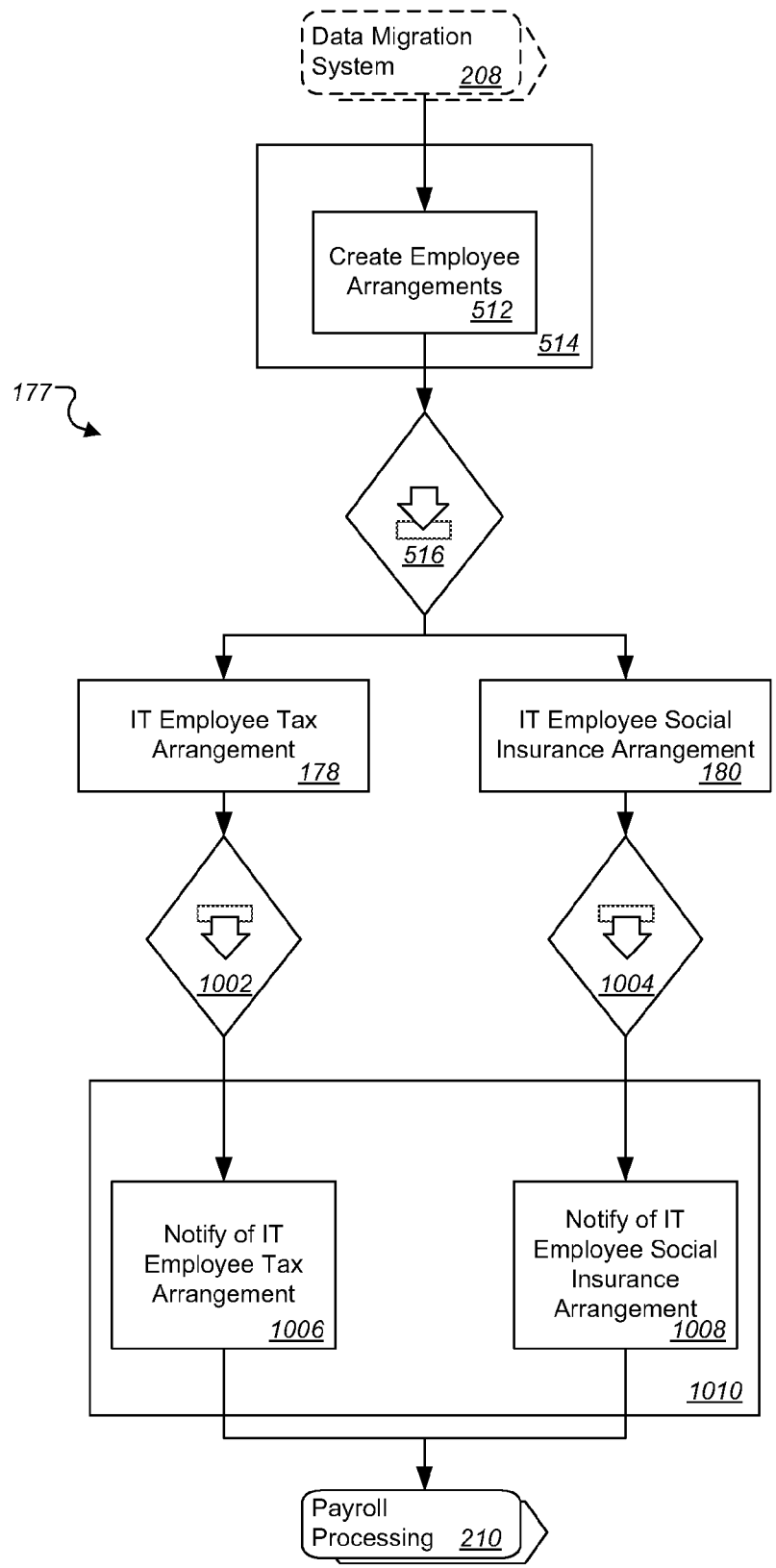
FIG. 10 is a block diagram of an IT employer regulatory compliance process component.

FIG. 10 is a block diagram of the IT Employer Regulatory Compliance process component 177 (FIG. 1B). The IT Employer Regulatory Compliance process component 177 represents the administration of employee data and reporting to authorities that employers in Italy are legally obligated to perform.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The IT Employer Regulatory Compliance process component 177 includes the IT Employee Tax Arrangement business object 178 and the IT Employee Social Insurance Arrangement business object 180. The IT Employee Tax Arrangement business object 178 represents the arrangement by the responsible tax authorities for the employee concerning calculation and reporting of income tax deductions according to Italian legal requirements. The IT Employee Tax Arrangement business object 178 contains parameters recorded to the employee (e.g., tax authorities, tax classes, taxation type to be used), supplementary details (e.g., declared income, number of family members). The IT Employee Social Insurance Arrangement business object 180 represents the arrangement for the employee by the Italian bodies that are legally responsible for administering the employee's social insurance contributions and benefits. This arrangement concerns the information required for calculation of Italian social insurance contributions and reporting according to the Italian's Social Insurance bodies. It contains basically the list of the social insurance contributions and to which body it must be paid.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 triggers the inbound process agent 516 to update the IT Employee Tax Arrangement business object 178 or the IT Employee Social Insurance Arrangement business object 180. An update in the IT Employee Tax Arrangement business object 178 triggers an asynchronous outbound process agent 1002 to invoke a Notify of IT Employee Tax Arrangement operation 1006. The operation 1006 is included in an IT Employer Regulatory Compliance in Payroll Input Maintenance Out interface 1010. The Notify of IT Employee Tax Arrangement operation 1006 sends a notification to the Payroll Processing process component 210 regarding new or changed tax data for an Italian employee.

An update in the IT Employee Social Insurance Arrangement business object 180 triggers an asynchronous outbound process agent 1004 to invoke a Notify of IT Employee Social Insurance Arrangement operation 1008. The operation 1008 is included in the IT Employer Regulatory Compliance in Payroll Input Maintenance Out interface 1010. The Notify of IT Employee Social Insurance Arrangement operation 1008 sends a notification to the Payroll Processing process component 210 regarding new or changed social insurance data for an Italian employee.

Figure 11:
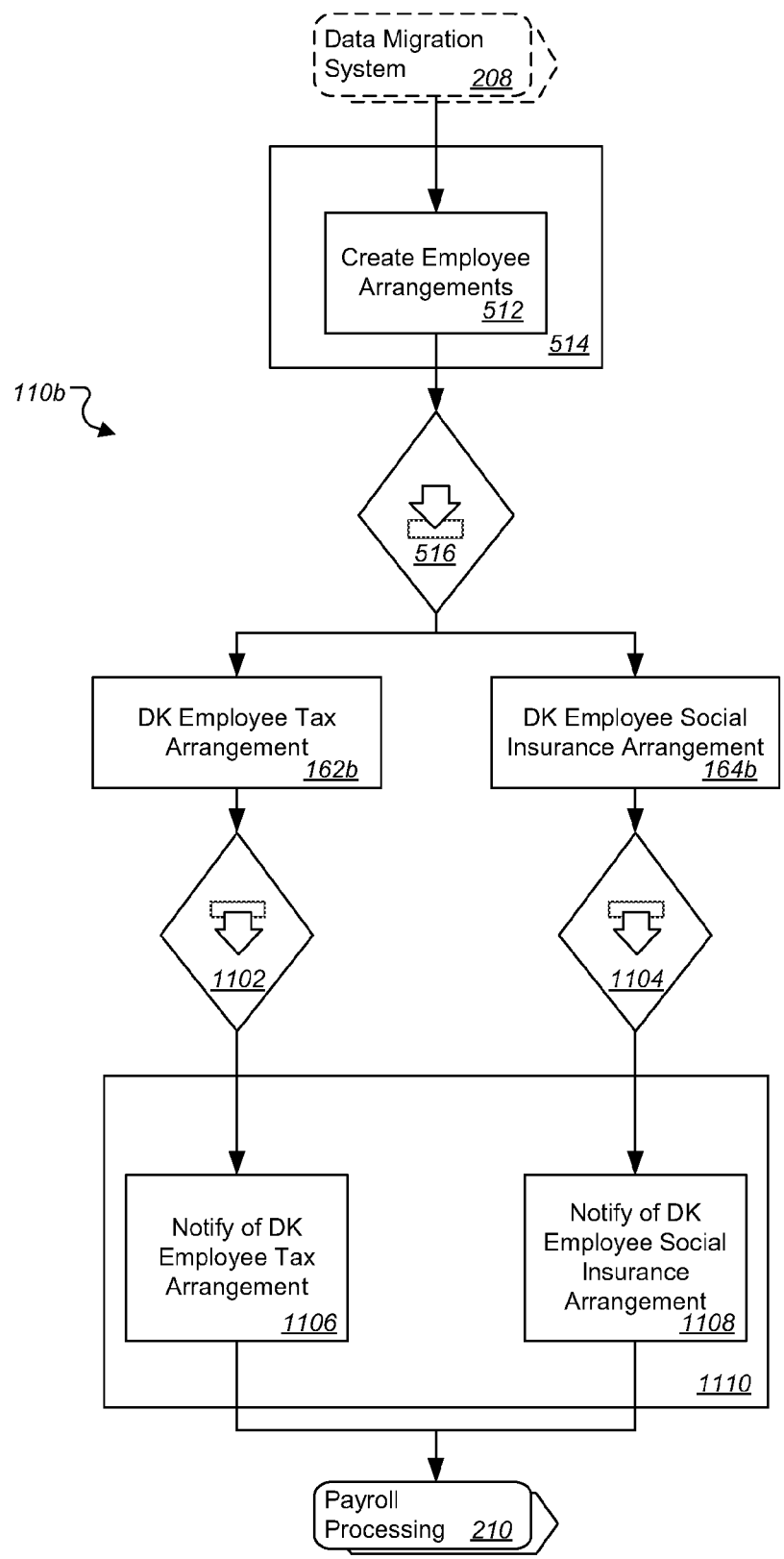
FIG. 11 is a block diagram of a DK employer regulatory compliance process component.

FIG. 11 is a block diagram of the DK Employer Regulatory Compliance process component 110b (FIG. 1B). The DK Employer Regulatory Compliance process component 110b represents the combination of all reporting and other administrative activities that an employer in Denmark is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The DK Employer Regulatory Compliance process component 110b includes the DK Employee Tax Arrangement master data object 162b and the DK Employee Social Insurance Arrangement master data object 164b. The DK Employee Tax Arrangement master data object 162b represents the arrangement between the employee and the tax authorities of Denmark that define the rules of how the employer must calculate and report taxes for this employee to be compliant with the legal requirements of Denmark. The DK Employee Social Insurance Arrangement master data object 164b represents the arrangement for the employee by all responsible Danish bodies that are legally responsible for administering the employee's social insurance contributions. This arrangement concerns the information required for calculation of Danish social insurance contributions and reporting according to the Danish legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the DK Employee Tax Arrangement business object 162b or the DK Employee Social Insurance Arrangement business object 164b. An update in the DK Employee Tax Arrangement master data object 162b triggers an outbound process agent 1102 to invoke a Notify of DK Employee Tax Arrangement operation 1106. The operation 1106 is included in a DK Employer Regulatory Compliance in Payroll Input Maintenance Out interface 1110. The Notify of DK Employee Tax Arrangement operation 1106 sends a notification to the Payroll Processing process component 210 regarding new or changed tax data for a Danish employee.

An update in the DK Employee Social Insurance Arrangement master data object 164b triggers an outbound process agent 1104 to invoke a Notify of DK Employee Social Insurance Arrangement operation 1108. The operation 1108 is included in the DK Employer Regulatory Compliance in payroll Input Maintenance Out interface 1110. The Notify of DK Employee Social Insurance Arrangement operation 1108 sends a notification to the Payroll Processing process component 210 regarding new or changed social insurance data for a Danish employee.

Figure 12:
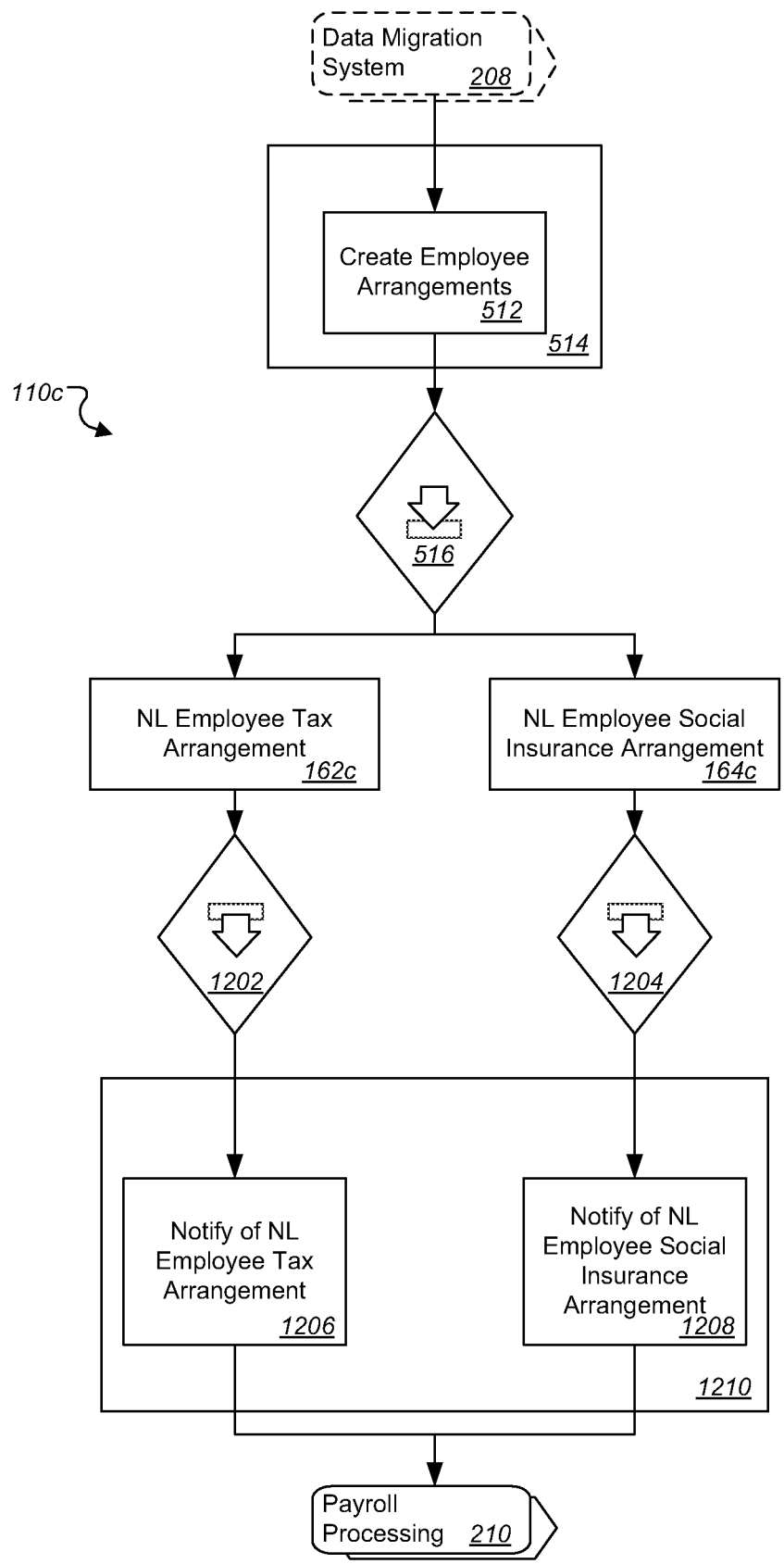
FIG. 12 is a block diagram of an NL employer regulatory compliance process component.

FIG. 12 is a block diagram of the NL Employer Regulatory Compliance process component 110c (FIG. 1B). The NL Employer Regulatory Compliance process component 110c represents the combination of all activities an employer in Netherlands is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The NL Employer Regulatory Compliance process component 110c includes the NL Employee Tax Arrangement master data object 162c and the NL Employee Social Insurance Arrangement master data object 164c. The NL Employee Tax Arrangement master data object 162c represents the arrangement between the employee and the tax authorities of the Netherlands that defines the rules of how the employer must calculate and report taxes for this employee to be compliant with the legal requirements of Netherlands. The NL Employee Social Insurance Arrangement master data object 164c represents the arrangement for the employee by all responsible Dutch bodies that are legally responsible for administering the employee's social insurance contributions. This arrangement concerns the information required for calculation of Dutch social insurance contributions and reporting according to the Netherlands legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the NL Employee Tax Arrangement business object 162c or the NL Employee Social Insurance Arrangement business object 164c. An update in the NL Employee Tax Arrangement master data object 162c triggers an outbound process agent 1202 to invoke a Notify of NL Employee Tax Arrangement operation 1206. The operation 1206 is included in a NL Employer Regulatory Compliance in Payroll Input Maintenance Out interface 1210. The Notify of NL Employee Tax Arrangement operation 1206 sends a notification to the Payroll Processing process component 210 regarding new or changed tax data for a Dutch employee.

An update in the NL Employee Social Insurance Arrangement master data object 164c triggers an outbound process agent 1204 to invoke a Notify of NL Employee Social Insurance Arrangement operation 1208. The operation 1208 is included in the NL Employer Regulatory Compliance in Payroll Input Maintenance Out interface 1210. The Notify of NL Employee Social Insurance Arrangement operation 1208 sends a notification to the Payroll Processing process component 210 regarding new or changed social insurance data for a Dutch employee.

Figure 13:
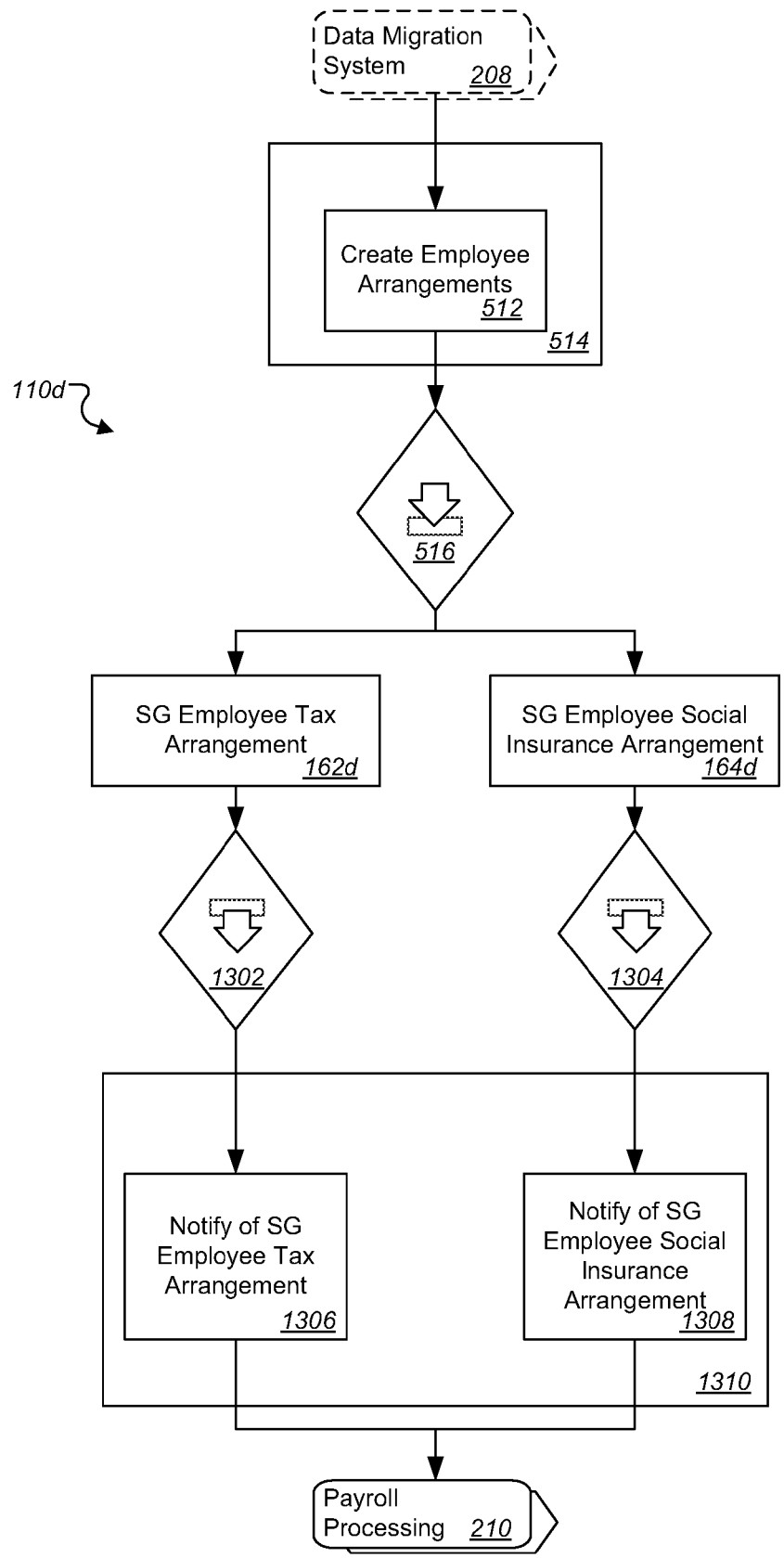
FIG. 13 is a block diagram of a SG employer regulatory compliance process component.

FIG. 13 is a block diagram of the SG Employer Regulatory Compliance process component 110d (FIG. 1C). The SG Employer Regulatory Compliance process component 110d represents the combination of all reporting and other administrative activities that an employer in Singapore is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The SG Employer Regulatory Compliance process component 110d includes the SG Employee Tax Arrangement master data object 162d and the SG Employee Social Insurance Arrangement master data object 164d. The SG Employee Tax Arrangement master data object 162d represents the arrangement between the employee and the tax authorities of the Singapore that defines the rules of how the employer must calculate and report taxes for this employee to be compliant with the legal requirements of Singapore. The SG Employee Social Insurance Arrangement master data object 164d represents the arrangement for the employee by all responsible Singaporean bodies that are legally responsible for administering the employee's social insurance contributions. This arrangement concerns the information required for calculation of Singaporean social insurance contributions and reporting according to the Singapore legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the SG Employee Tax Arrangement business object 162d or the SG Employee Social Insurance Arrangement business object 164d. An update in the SG Employee Tax Arrangement master data object 162d triggers an outbound process agent 1302 to invoke a Notify of SG Employee Tax Arrangement operation 1306. The operation 1306 is included in a SG Employer Regulatory Compliance in Payroll Input Maintenance Out interface 1310. The Notify of SG Employee Tax Arrangement operation 1306 sends a notification to the Payroll Processing process component 210 regarding new or changed tax data for a Singaporean employee.

An update in the SG Employee Social Insurance Arrangement master data object 164d triggers an outbound process agent 1304 to invoke a Notify of SG Employee Social Insurance Arrangement operation 1308. The operation 1308 is included in the SG Employer Regulatory Compliance in Payroll Input Maintenance Out interface 1310. The Notify of SG Employee Social Insurance Arrangement operation 1308 sends a notification to the Payroll Processing process component 210 regarding new or changed social insurance data for a Singaporean employee.

Figure 14:
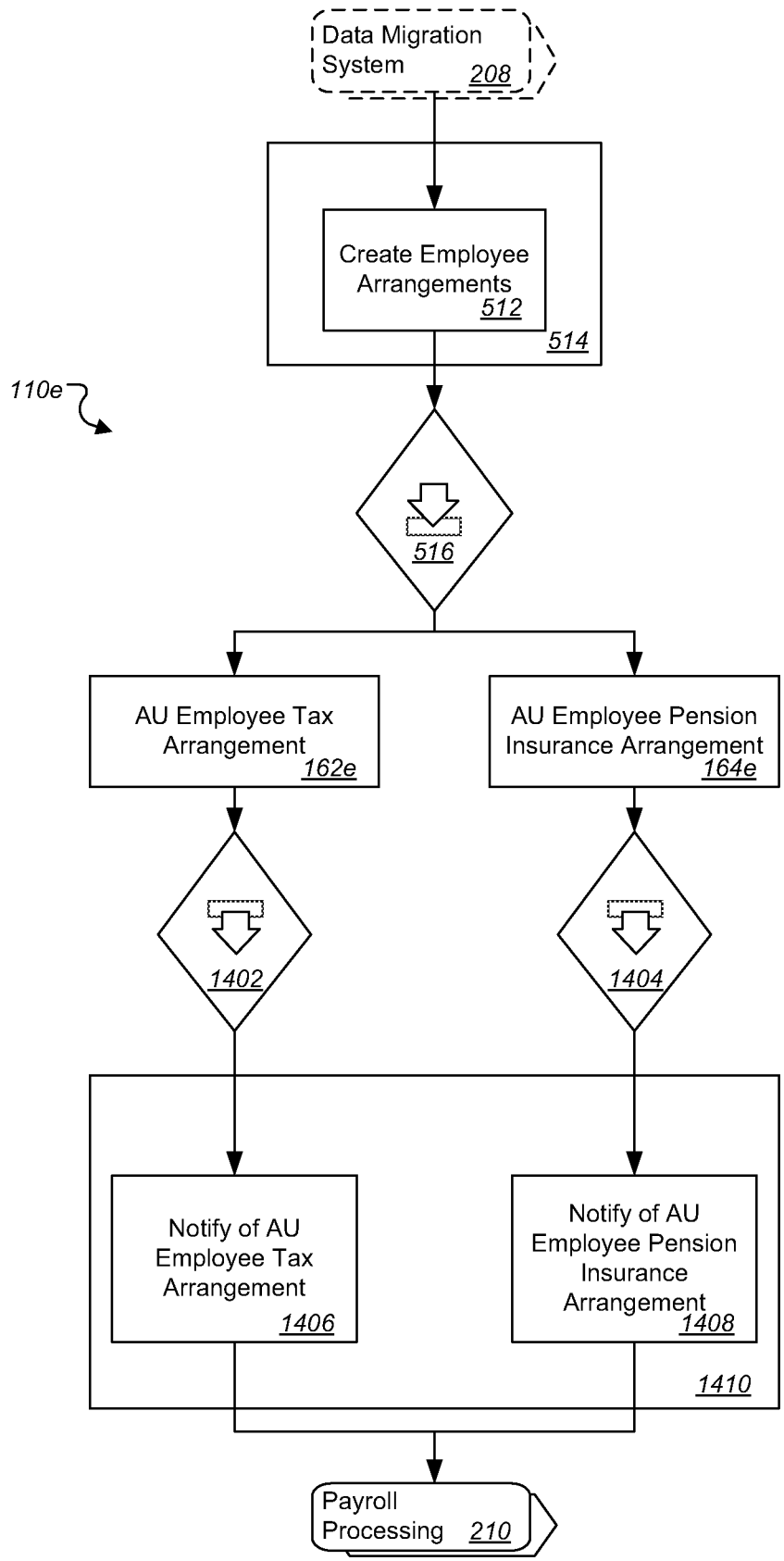
FIG. 14 is a block diagram of an AU employer regulatory compliance process component.

FIG. 14 is a block diagram of the AU Employer Regulatory Compliance process component 110e (FIG. 1C). The AU Employer Regulatory Compliance process component 110e represents the combination of all activities an employer in Australia is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The AU Employer Regulatory Compliance process component 110e includes the AU Employee Tax Arrangement master data object 162e and the AU Employee Pension Insurance Arrangement master data object 164e. The AU Employee Tax Arrangement master data object 162e represents the arrangement between the employee and the tax authorities of Australia that defines the rules of how the employer must calculate and report taxes for this employee to be compliant with the legal requirements of Australia. The AU Employee Pension Insurance Arrangement master data object 164e represents the arrangement for the employee by all responsible Australian bodies that are legally responsible for administering the employee's social insurance contributions. This arrangement concerns the information required for calculation of Australia pension insurance contributions and reporting according to the Australian legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the AU Employee Tax Arrangement business object 162e or the AU Employee Pension Insurance Arrangement business object 164e. An update in the AU Employee Tax Arrangement master data object 162e triggers an outbound process agent 1402 to invoke a Notify of AU Employee Tax Arrangement operation 1406. The operation 1406 is included in an AU Employer Regulatory Compliance in Payroll Input Maintenance Out interface 1410. The Notify of AU Employee Tax Arrangement operation 1406 sends a notification to the Payroll Processing process component 210 regarding new or changed tax data for an Australian employee.

An update in the AU Employee Pension Insurance Arrangement master data object 164e triggers an outbound process agent 1404 to invoke a Notify of AU Employee Pension Insurance Arrangement operation 1408. The operation 1408 is included in the AU Employer Regulatory Compliance in Payroll Input Maintenance Out interface 1410. The Notify of AU Employee Pension Insurance Arrangement operation 1408 sends a notification to the Payroll Processing process component 210 regarding new or changed pension insurance data for an Australian employee.

Figure 15:
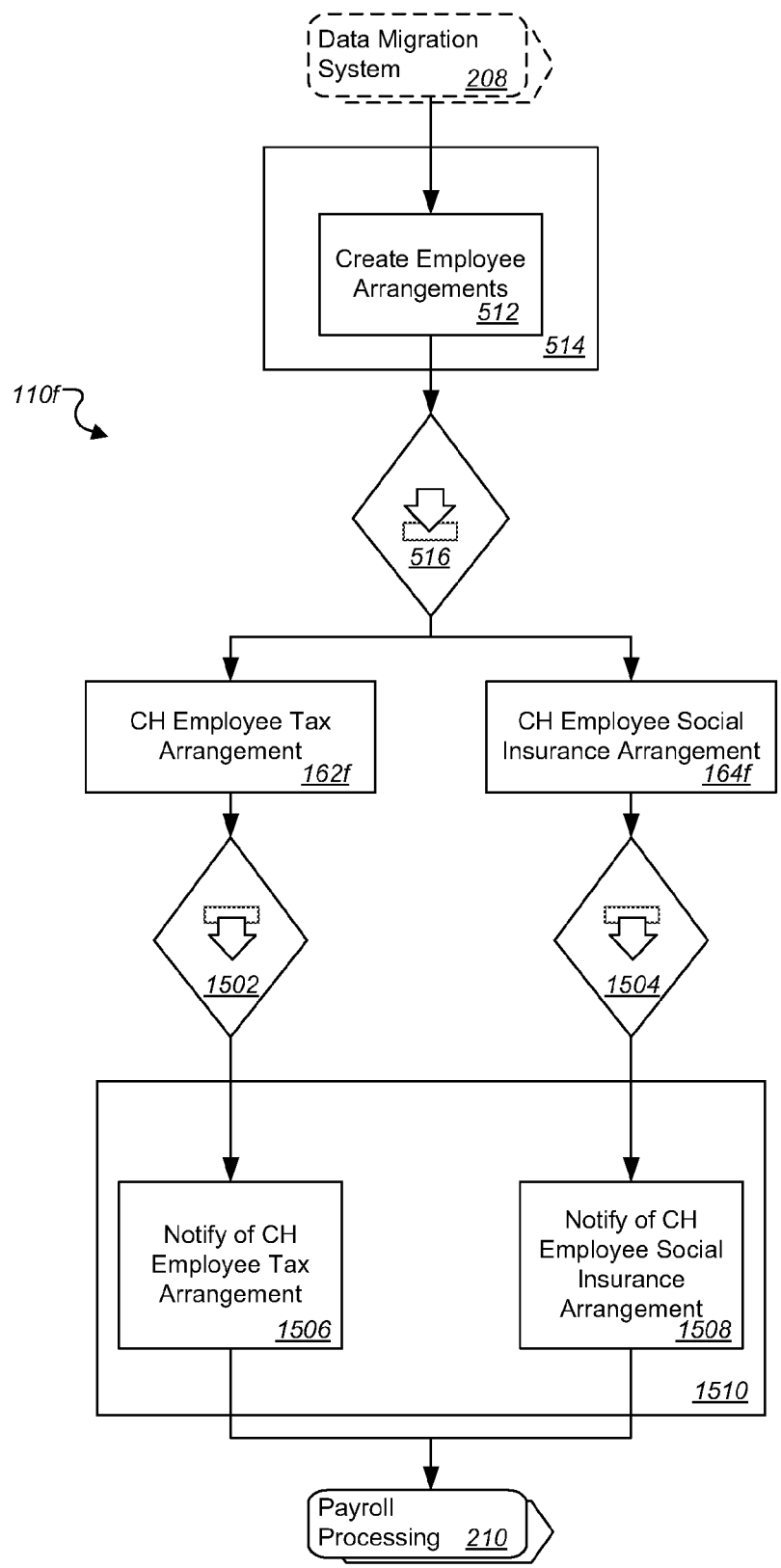
FIG. 15 is a block diagram of a CH employer regulatory compliance process component.

FIG. 15 is a block diagram of the CH Employer Regulatory Compliance process component 110f (FIG. 1C). The CH Employer Regulatory Compliance process component 110f represents the combination of all reporting and other administrative activities that an employer in Switzerland is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The CH Employer Regulatory Compliance process component 110f includes the CH Employee Tax Arrangement master data object 162f and the CH Employee Social Insurance Arrangement master data object 164f. The CH Employee Tax Arrangement master data object 162f represents the arrangement between the employee and the tax authorities of the Switzerland that defines the rules of how the employer must calculate and report taxes for this employee to be compliant with the legal requirements of Switzerland. The CH Employee Social Insurance Arrangement master data object 164f represents the arrangement for the employee by all responsible Switzerland bodies that are legally responsible for administering the employee's social insurance contributions. This arrangement concerns the information required for calculation of Switzerland social insurance contributions and reporting according to the Switzerland legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the CH Employee Tax Arrangement business object 162f or the CH Employee Social Insurance Arrangement business object 164f. An update in the CH Employee Tax Arrangement master data object 162f triggers an outbound process agent 1502 to invoke a Notify of CH Employee Tax Arrangement operation 1506. The operation 1506 is included in a CH Employer Regulatory Compliance in Payroll Input Maintenance Out interface 1510. The Notify of CH Employee Tax Arrangement operation 1506 sends a notification to the Payroll Processing process component 210 regarding new or changed tax data for a Swiss employee.

An update in the CH Employee Social Insurance Arrangement master data object 164f triggers an outbound process agent 1504 to invoke a Notify of CH Employee Social Insurance Arrangement operation 1508. The operation 1508 is included in the CH Employer Regulatory Compliance in Payroll Input Maintenance Out interface 1510. The Notify of CH Employee Social Insurance Arrangement operation 1508 sends a notification to the Payroll Processing process component 210 regarding new or changed social insurance data for a Swiss employee.

Figure 16:
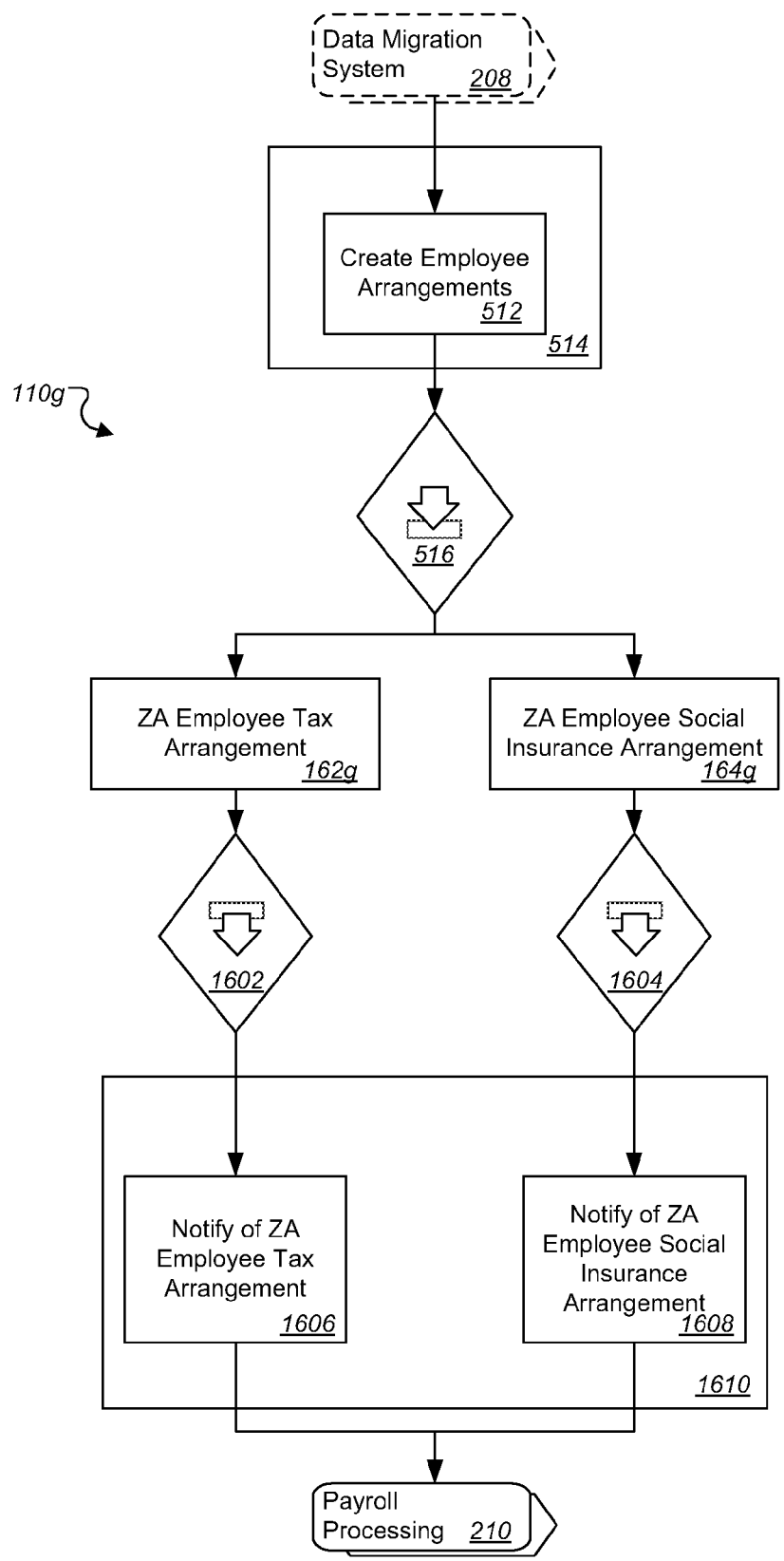
FIG. 16 is a block diagram of a ZA employer regulatory compliance process component.

FIG. 16 is a block diagram of the ZA Employer Regulatory Compliance process component 110g (FIG. 1C). The ZA Employer Regulatory Compliance process component 110g represents the combination of all activities an employer in South Africa is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The ZA Employer Regulatory Compliance process component 110g includes the ZA Employee Tax Arrangement master data object 162g and the ZA Employee Social Insurance Arrangement master data object 164g. The ZA Employee Tax Arrangement master data object 162g represents the arrangement between the employee and the tax authorities of South Africa that defines the rules of how the employer must calculate and report taxes for this employee to be compliant with the legal requirements of South Africa. The ZA Employee Social Insurance Arrangement master data object 164g represents the arrangement for the employee by all responsible South African bodies that are legally responsible for administering the employee's social insurance contributions. This arrangement concerns the information required for calculation of South African social insurance contributions and reporting according to the South African legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the ZA Employee Tax Arrangement business object 162g or the ZA Employee Social Insurance Arrangement business object 164g. An update in the ZA Employee Tax Arrangement master data object 162g triggers an outbound process agent 1602 to invoke a Notify of ZA Employee Tax Arrangement operation 1606. The operation 1606 is included in a ZA Employer Regulatory Compliance in Payroll Input Maintenance Out interface 1610. The Notify of ZA Employee Tax Arrangement operation 1606 sends a notification to the Payroll Processing process component 210 regarding new or changed tax data for a South African employee.

An update in the ZA Employee Social Insurance Arrangement master data object 164g triggers an outbound process agent 1604 to invoke a Notify of ZA Employee Social Insurance Arrangement operation 1608. The operation 1608 is included in the ZA Employer Regulatory Compliance in Payroll Input Maintenance Out interface 1610. The Notify of ZA Employee Social Insurance Arrangement operation 1608 sends a notification to the Payroll Processing process component 210 regarding new or changed social insurance data for a South African employee.

Figure 17:
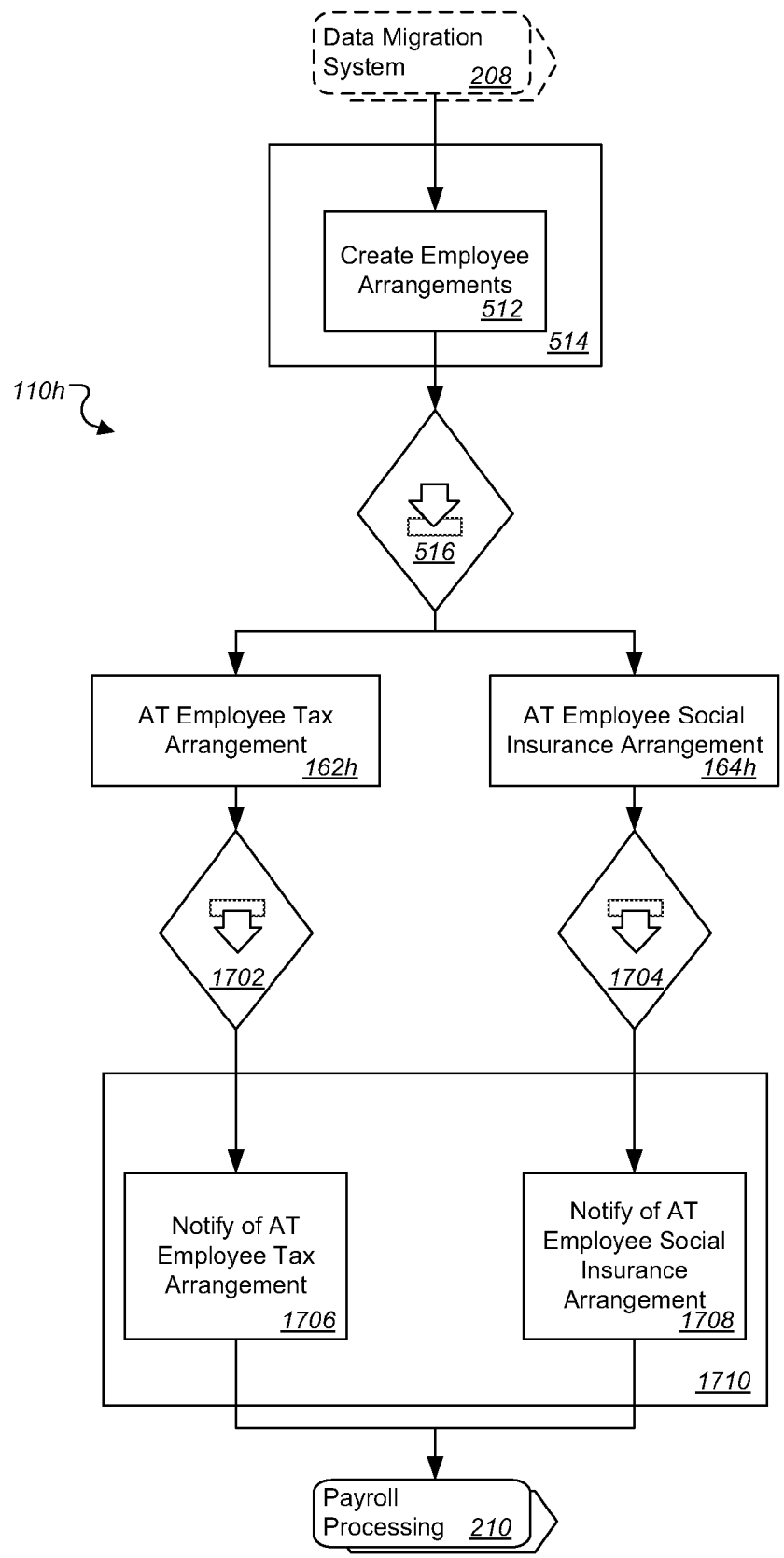
FIG. 17 is a block diagram of an AT employer regulatory compliance process component.

FIG. 17 is a block diagram of the AT Employer Regulatory Compliance process component 110h (FIG. 1C). The AT Employer Regulatory Compliance process component 110h represents the combination of all reporting and other administrative activities that an employer in Austria is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The AT Employer Regulatory Compliance process component 110h includes the AT Employee Tax Arrangement master data object 162h and the AT Employee Social Insurance Arrangement master data object 164h. The AT Employee Tax Arrangement master data object 162h represents the arrangement between the employee and tax authorities of the Austria that defines the rules of how the employer must calculate and report taxes for this employee to be compliant with the legal requirements of Austria. The AT Employee Social Insurance Arrangement master data object 164h represents the arrangement for the employee by all responsible Austria bodies that are legally responsible for administering the employee's social insurance contributions. This arrangement concerns the information required for calculation of Austria social insurance contributions and reporting according to the Austria legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the AT Employee Tax Arrangement business object 162h or the AT Employee Social Insurance Arrangement business object 164h. An update in the AT Employee Tax Arrangement master data object 162h triggers an outbound process agent 1702 to invoke a Notify of AT Employee Tax Arrangement operation 1706. The operation 1706 is included in an AT Employer Regulatory Compliance in Payroll Input Maintenance Out interface 1710. The Notify of AT Employee Tax Arrangement operation 1706 sends a notification to the Payroll Processing process component 210 regarding new or changed tax data for an Austrian employee.

An update in the AT Employee Social Insurance Arrangement master data object 164h triggers an outbound process agent 1704 to invoke a Notify of AT Employee Social Insurance Arrangement operation 1708. The operation 1708 is included in the AT Employer Regulatory Compliance in Payroll Input Maintenance Out interface 1710. The Notify of AT Employee Social Insurance Arrangement operation 1708 sends a notification to the Payroll Processing process component 210 regarding new or changed social insurance data for an Austrian employee.

Figure 18:
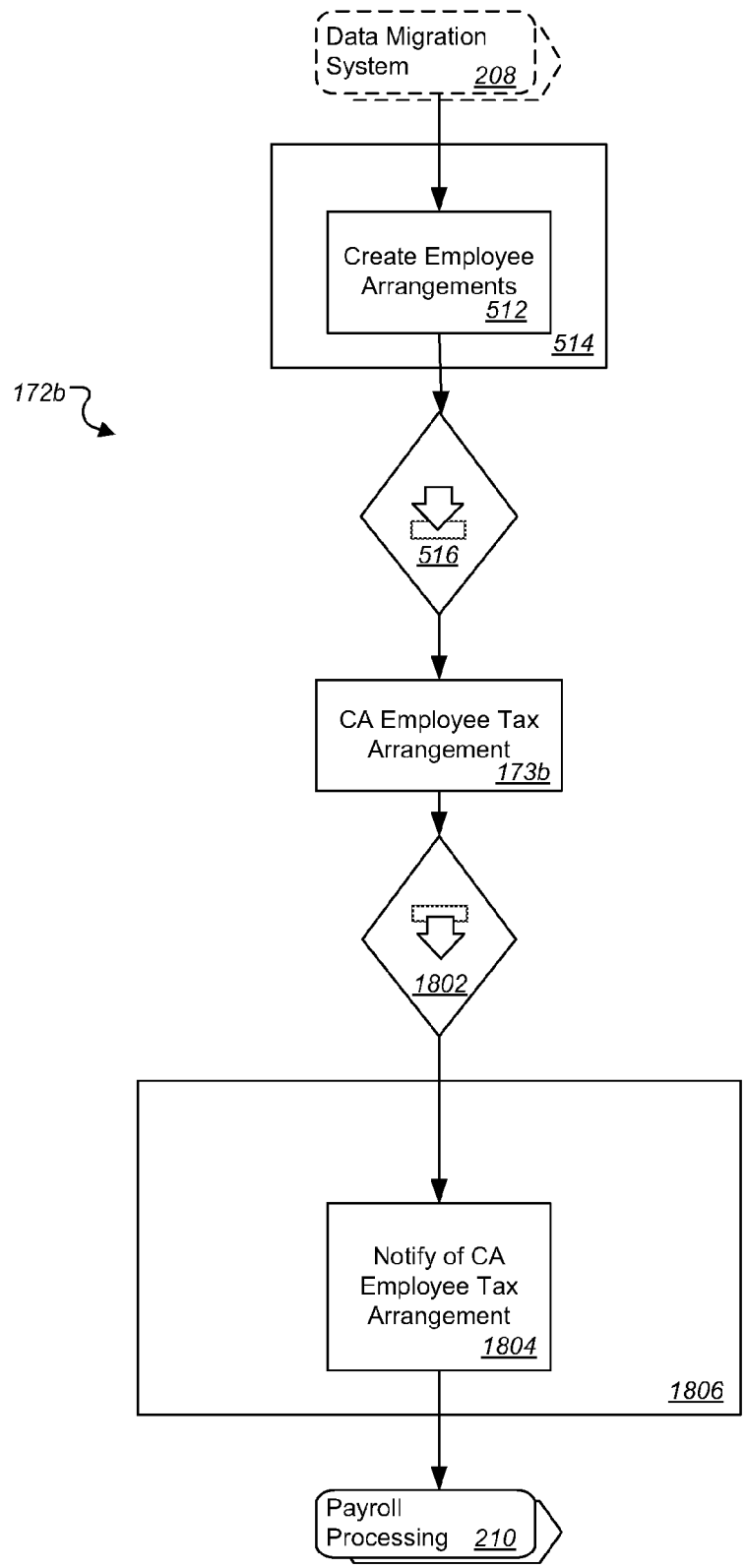
FIG. 18 is a block diagram of a CA employer regulatory compliance process component.

FIG. 18 is a block diagram of the CA Employer Regulatory Compliance process component 172b (FIG. 1C). The CA Employer Regulatory Compliance process component 172b the combination of all activities an employer in Canada is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The CA Employer Regulatory Compliance process component 172b includes the CA Employee Tax Arrangement business object 173b. The CA Employee Tax Arrangement business object 173b represents the arrangement between the employee and the tax authorities of Canada that defines the rules of how the employer must calculate and report taxes for this employee to be compliant with the legal requirements of Canada.

The Data Migration System external process component 208 can invoke a Create Employee Arrangements operation 512. The Create Employee Arrangements operation 512 is included in an Employee Migration In interface 514. The Create Employee Arrangements operation 512 creates business objects for employee arrangements. The Create Employee Arrangements operation 512 uses an inbound process agent 516 to update the CA Employee Tax Arrangement business object 173b. An update in the CA Employee Tax Arrangement business object 173b triggers an outbound process agent 1802 to invoke a Notify of CA Employee Tax Arrangement operation 1804. The operation 1804 is included in a CA Employer Regulatory Compliance in Payroll Input Maintenance Out interface 1806. The Notify of CA Employee Tax Arrangement operation 1804 sends a notification to the Payroll Processing process component 210 regarding new or changed tax data for a Canadian employee.

Figure 19:
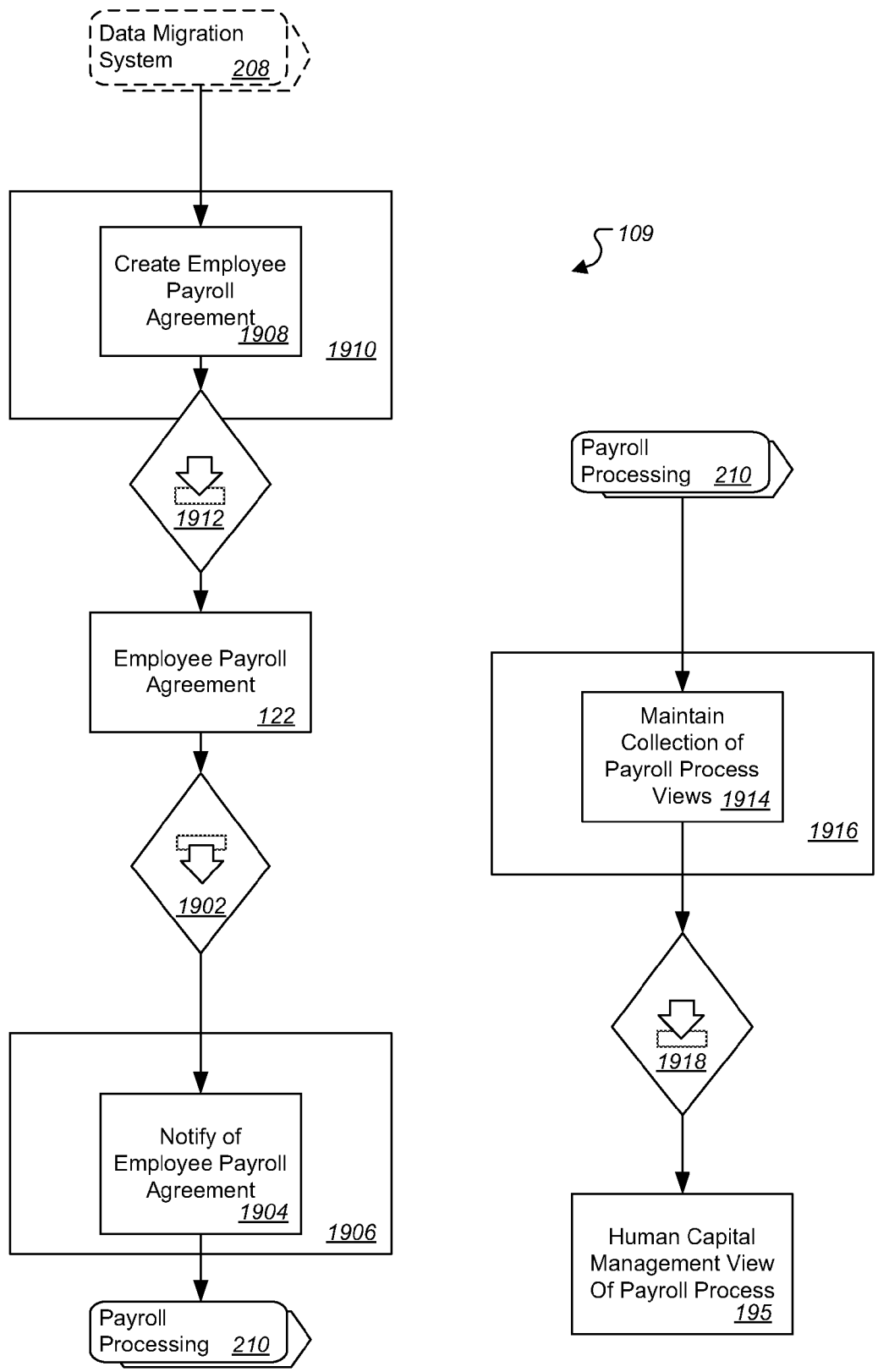
FIG. 19 is a block diagram of an employee payroll administration process component.

FIG. 19 is a block diagram of the Employee Payroll Administration process component 109 (FIG. 1A). The Employee Payroll Administration process component 109 handles the administration of the employee specific payroll agreement and the overview of completed and planned payroll processes.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The Employee Payroll Administration process component 109 includes the Employee Payroll Agreement master data object 122 and the Human Capital Management View of Payroll Process business object 195. The Employee Payroll Agreement master data object 122 represents an agreement between the employer and employee concerning the personal conditions for payroll processing that determine the fundamental differentials of the payroll behavior for the employee. The Human Capital Management View of Payroll Process business object 195 represents a view from the Human Capital Management deployment unit 102 of a payroll process.

The Data Migration System external process component 208 can invoke a Create Employee Payroll Agreement operation 1908. The Create Employee Payroll Agreement operation 1908 is included Employee Payroll Agreement Migration In interface 1910. The Create Employee Payroll Agreement operation 1908 converts information about payroll agreement data of an employee which is to be migrated from a legacy system into employee payroll administration. The Create Employee Payroll Agreement operation 1908 uses an inbound process agent 1912 to update the Employee Payroll Agreement master data object 122. An update in the Employee Payroll Agreement master data object 122 triggers an asynchronous outbound process agent 1902 to invoke a Notify of Employee Payroll Agreement operation 1904. The operation 1904 is included in an Employee Payroll Agreement in Payroll Input Maintenance Out interface 1906. The Notify of Employee Payroll Agreement operation 1904 sends a notification to the Payroll Processing process component 210 regarding changes to an employee payroll agreement.

The Payroll Processing process component 210 can invoke a Maintain Collection of Payroll Process Views operation 1914. The Maintain Collection of Payroll Process Views operation 1914 is included in a Payroll Process Employee Payroll Administration Notification In interface 1916. The Maintain Collection of Payroll Process Views operation 1914 notifies the view of the payroll process in the Human Capital Management deployment unit 102 of changes from the Payroll Processing process component 210. The Maintain Collection of Payroll Process Views operation 1914 uses an inbound process agent 1918 to update the Human Capital Management View of Payroll Process business object 195.

FIG. 20 is a block diagram of a Human Capital Master Data Management process component 2000 provided in the foundation layer 185. The Human Capital Master Data Management process component 2000 is used for managing work agreements, employments, and human capital master data that are used in different human capital management areas.

The Human Capital Master Data Management process component 2000 includes a Work Agreement master data object 186, an Employment master data object 188, and a Compensation Component Type master data object 190. The Work Agreement master data object 186 represents a contract between an employer and an employee by means of which the employee is obliged to provide his or her labor while the employer is obliged to provide the agreed compensation. The Employment master data object 188 represents a relationship which comes into being by virtue of one or more valid work agreements. The Employment master data object 188 encompasses the entire legal relationship between contracting parties. The Compensation Component Type master data object 190 represents types that divide up compensation components. The Compensation Component Type master data object 190 can include a description of the employee compensation components in the context of human resources.

Figure 21:
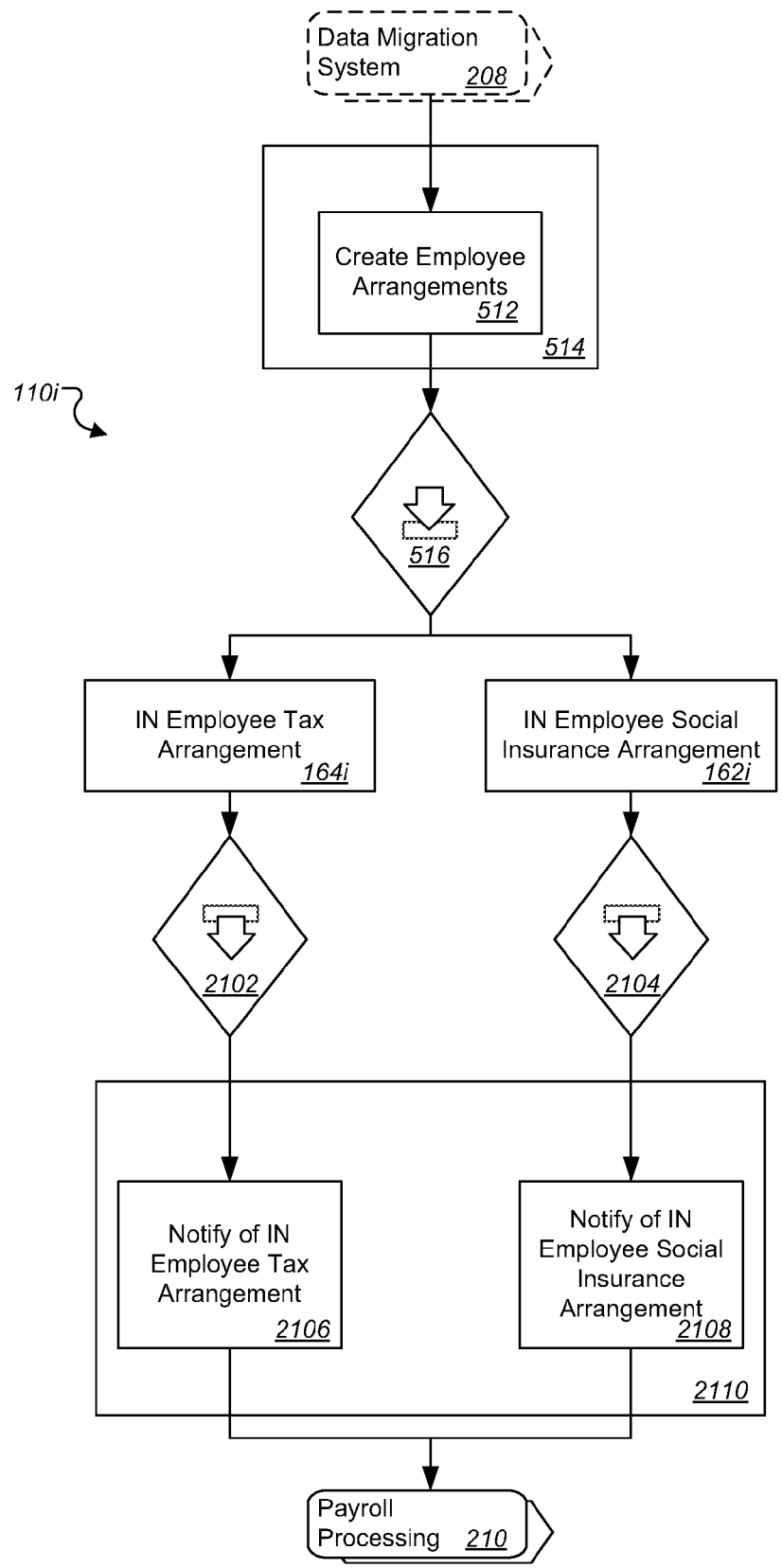
FIG. 21 is a block diagram of an IN employer regulatory compliance process component.

FIG. 21 is a block diagram of the IN Employer Regulatory Compliance process component 110i (FIG. 1C). The IN Employer Regulatory Compliance process component 110i represents the combination of reporting and other administrative activities that an employer in India is obliged to perform with respect to employees.

For convenience in describing this process component, a number of other process components are shown in the figure; these other process components are not part of the process component being described. These other process components are used to represent software external to the process component in describing its interactions with the external software; however, while the external software can be implemented as such process components, this is not required. These other process components include the Data Migration System external process component 208 and the Payroll Processing process component 210.

The IN Employer Regulatory Compliance process component 110i includes the IN Employee Tax Arrangement master data object 162i and the IN Employee Social Insurance Arrangement master data object 164i. The IN Employee Tax Arrangement master data object 162i represents the arrangement between the employee and tax authorities of the India that defines the rules of how the employer calculates and reports taxes for this employee to be compliant with the legal requirements of India. The IN Employee Social Insurance Arrangement master data object 164i represents the arrangement for the employee by all responsible Indian bodies that are legally responsible for administering the employee's social insurance contributions. This arrangement concerns the information required for calculation of Indian social insurance contributions and reporting according to the Indian legal requirements.

The Data Migration System external process component 208 can invoke the Create Employee Arrangements operation 512. The Create Employee Arrangements operation 512 is included in the Employee Migration In interface 514. The Create Employee Arrangements operation 512 creates business objects for employee arrangements. The Create Employee Arrangements operation 512 uses the inbound process agent 516 to update the IN Employee Tax Arrangement business object 162i or the IN Employee Social Insurance Arrangement business object 164i. An update in the IN Employee Tax Arrangement master data object 162i triggers an outbound process agent 2102 to invoke a Notify of IN Employee Tax Arrangement operation 2106. The operation 2106 is included in an IN Employer Regulatory Compliance in Payroll Input Maintenance Out interface 2110. The Notify of IN Employee Tax Arrangement operation 2106 sends a notification to the Payroll Processing process component 210 regarding new or changed tax data for an Indian employee.

An update in the IN Employee Social Insurance Arrangement master data object 164i triggers an outbound process agent 2104 to invoke a Notify of IN Employee Social Insurance Arrangement operation 2108. The operation 2108 is included in the IN Employer Regulatory Compliance in the Payroll Input Maintenance Out interface 2110. The Notify of IN Employee Social Insurance Arrangement operation 2108 sends a notification to the Payroll Processing process component 210 regarding new or changed social insurance data for an Indian employee.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as an exemplification of preferred embodiments of the specification. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system comprising:
   a computer system comprising one or more hardware platforms for executing computer software;
   computer software deployed on the computer system, the computer software implementing a plurality of service operations, the service operations comprising:
   a first create employee arrangements operation to create business objects for employee arrangements relating to an AT employer regulatory compliance process component;
   a notify of AT employee social insurance arrangement operation operable to notify the payroll processing deployment unit about new or changed social insurance data for an AT employee in the human capital management deployment unit;
   a notify of AT employee tax arrangement operation operable to notify the payroll processing deployment unit about new or changed tax data for an AT employee in the human capital management deployment unit;
   a second create employee arrangements operation operable to create business objects for employee arrangements relating to an AU employer regulatory compliance process component;
   a notify of AU employee pension insurance arrangement operation operable to notify the payroll processing deployment unit about new or changed pension insurance data for an AU employee in the human capital management deployment unit;
   a notify of AU employee tax arrangement operation operable to notify the payroll processing deployment unit about new or changed tax data for an AU employee in the human capital management deployment unit;
   a third create employee arrangements operation operable to create business objects for employee arrangements relating to a CA employer regulatory compliance process component;
   a notify of CA employee tax arrangement operation operable to notify the payroll processing deployment unit about new or changed tax data for a CA employee in the human capital management deployment unit;
   a fourth create employee arrangements operation operable to create business objects for employee arrangements relating to a CH employer regulatory compliance process component;
   a notify of CH employee social insurance arrangement operation operable to notify the payroll processing deployment unit about new or changed social insurance data for a CH employee in the human capital management deployment unit;
   a notify of CH employee tax arrangement operation operable to notify the payroll processing deployment unit about new or changed tax data for a CH employee in the human capital management deployment unit;
   a fifth create employee arrangements operation operable to create business objects for employee arrangements relating to a DK employer regulatory compliance process component;
   a notify of DK employee social insurance arrangement operation operable to notify the payroll processing deployment unit about new or changed social insurance data for a DK employee in the human capital management deployment unit;
   a notify of DK employee tax arrangement operation operable to notify the payroll processing deployment unit about new or changed tax data for a DK employee in the human capital management deployment unit;
   a sixth create employee arrangements operation operable to create business objects for employee arrangements relating to an NL employer regulatory compliance process component;
   a notify of NL employee social insurance arrangement operation operable to notify the payroll processing deployment unit about new or changed social insurance data for an NL employee in the human capital management deployment unit;
   a notify of NL employee tax arrangement operation operable to notify the payroll processing deployment unit about new or changed tax data for an NL employee in the human capital management deployment unit;
   a seventh create employee arrangements operation operable to create business objects for employee arrangements relating to an SG employer regulatory compliance process component;
   a notify of SG employee social insurance arrangement operation operable to notify the payroll processing deployment unit about new or changed social insurance data for an SG employee in the human capital management deployment unit;
   a notify of SG employee tax arrangement operation operable to notify the payroll processing deployment unit about new or changed tax data for a SG employee in the human capital management deployment unit;
   an eighth create employee arrangements operation operable to create business objects for employee arrangements relating to a ZA employer regulatory compliance process component;
   a notify of ZA employee social insurance arrangement operation operable to notify the payroll processing deployment unit about new or changed social insurance data for a ZA employee in the human capital management deployment unit;
   a notify of ZA employee tax arrangement operation operable to notify the payroll processing deployment unit about new or changed tax data for a ZA employee in the human capital management deployment unit;

a ninth create employee arrangements operation operable to create business objects for employee arrangements relating to a CN employer regulatory compliance process component;

a notify of CN employee social insurance arrangement operation operable to notify the payroll processing deployment unit about new or changed social insurance data for a CN employee in the human capital management deployment unit;

a notify of CN employee tax arrangement operation operable to notify the payroll processing deployment unit about new or changed tax data for a CN employee in the human capital management deployment unit;

a create employee compensation agreement operation operable to create an employee compensation agreement;

a notify of employee compensation agreement operation operable to notify the process component payroll processing about the agreement between an employer and an employee detailing all compensation components that are relevant to the employee;

a tenth create employee arrangements operation operable to create business objects for employee arrangements relating to a DE employer regulatory compliance process component;

a notify of DE employee social insurance arrangement operation operable to notify the payroll processing deployment unit about new or changed social insurance data for a DE employee in the human capital management deployment unit;

a notify of DE employee tax arrangement operation operable to notify the payroll processing deployment unit about new or changed tax data for a DE employee in the human capital management deployment unit;

a create employee payroll agreement operation operable to convert information about payroll agreement data of an employee which is to be migrated from a legacy system into employee payroll administration;

a maintain collection of payroll process view operation operable to notify the view of the payroll process in the human capital management deployment unit of changes to the payroll process business object;

a notify of employee payroll agreement operation operable to notify the payroll deployment unit of changes to the employee payroll agreement business object in the human capital management deployment unit;

an eleventh create employee arrangements operation operable to create business objects for employee arrangements relating to a FR employer regulatory compliance process component;

a notify of FR employee social insurance arrangement operation operable to notify the payroll processing deployment unit about new or changed social insurance data for a FR employee in the human capital management deployment unit;

a twelfth create employee arrangements operation operable to create business objects for employee arrangements relating to a GB employer regulatory compliance process component;

a notify of GB employee social insurance arrangement operable operation to notify the payroll processing deployment unit about new or changed social insurance data for a GB employee in the human capital management deployment unit;

a notify of GB employee tax arrangement operation operable to notify the payroll processing deployment unit about new or changed tax data for a GB employee in the human capital management deployment unit;

a thirteenth create employee arrangements operation operable to create business objects for employee arrangements relating to a IT employer regulatory compliance process component;

a notify of IT employee social insurance arrangement operation operable to notify the payroll processing deployment unit about new or changed social insurance data for an IT employee in the human capital management deployment unit;

a notify of IT employee tax arrangement operation operable to notify the payroll processing deployment unit about new or changed tax data for an IT employee in the human capital management deployment unit;

a create employment operation operable to convert information about an employment which is to be migrated from a legacy system into employment based on message type employment migrate request;

a create employee time information operation operable to convert information about an employee's time data that is to be migrated from a legacy system to time and labor management;

a maintain operation operable to create, change, or delete an employee time confirmation view of service transaction document;

a maintain employee time confirmation view of project operation operable to update the employee time confirmation view of project business object based on changes to the project business object in project processing;

a notify of employee time account operation operable to notify the payroll processing process component of changes to the employee time account business object;

a notify of employee time calendar operation operable to notify payroll processing of changes to the employee time calendar business object;

a notify of internal acknowledgement operation operable to notify goods and service acknowledgement of a service provided by an external employee sent when an active employee time that contains information relevant for goods and service acknowledgement is created, changed, or cancelled;

a notify of internal acknowledgement cancellation operation operable to notify goods and service acknowledgement of the cancellation of an externally provided service sent when an active employee time that contains information relevant for goods and service acknowledgement is cancelled;

a notify of planned working times operation operable to notify the country-specific employee payroll input business object about planned working times;

a notify of project task confirmation operation operable to notify project processing of a project task confirmation or a project task status change sent when project-relevant information is created, changed, or cancelled in an active employee time;

a notify of service provision operation operable to notify accounting of a service provision sent when an active employee time that contains information relevant for accounting is created;

a notify of service provision cancellation operation operable to notify accounting of the cancellation of a service provision sent when an active employee time that contains information relevant for accounting is cancelled;

a fourteenth create employee arrangements operation operable to create business objects for employee arrangements relating to the US employer regulatory compliance process component;

a notify of US employee tax arrangement operation operable to notify the payroll processing deployment unit about new or changed tax data for a US employee in the human capital management deployment unit;

a fifteenth create employee arrangements operation operable to create business objects fro employee arrangements relating to the IN employer regulatory compliance process component; and a notify of IN employee tax arrangement operation operable to notify the payroll processing deployment unit about new or changed tax data for an IN employee in the human capital management deployment unit.

2. The system of claim 1, wherein the service operations are grouped into service interfaces, the service interfaces comprising:

an AU employer regulatory compliance in payroll input maintenance out interface that includes the notify of AU employee pension insurance arrangement and the notify of AU employee tax arrangement service operations;

a CH employer regulatory compliance in payroll input maintenance out interface that includes the notify of CH employee tax arrangement and the notify of CH employee social insurance arrangement service operations;

a CA employer regulatory compliance in payroll input maintenance out interface that includes the notify of CA employee tax arrangement service operation;

a CN employer regulatory compliance in payroll input maintenance out interface that includes the notify of CN employee social insurance arrangement, and notify of CN employee tax arrangement service operations;

a DE employer regulatory compliance in payroll input maintenance out interface that includes the notify of DE employee social insurance arrangement, and notify of DE employee tax arrangement service operations;

a DK employer regulatory compliance in payroll input maintenance out interface that includes the notify of DK employee tax arrangement and notify of DK employee social insurance arrangement;

an AT employer regulatory compliance in payroll input maintenance out interface that includes the notify of AT employee social insurance arrangement and the notify of AT employee tax arrangement service operations;

an IN employer regulatory compliance in payroll input maintenance out interface that includes the notify of IN employee social insurance arrangement and the notify of IN employee tax arrangement service operations;

an employee compensation agreement in payroll input maintenance out interface that includes the notify of employee compensation agreement service operation;

an employee compensation agreement migration in interface that includes the create employee compensation agreement service operation;

an employee migration in interface that includes the create employee arrangements service operations for Austria, Australia, Canada, China, Denmark, France, Germany, India, Italy, the Netherlands, Singapore, South Africa, Switzerland, the United Kingdom, and the United States;

an employee payroll agreement in payroll input maintenance out interface that includes the notify of employee payroll agreement service operation;

an employee payroll agreement migration in interface that includes the create employee payroll agreement service operation;

an employee time agreement in payroll input maintenance out interface that includes the notify of planned working times service operation;

an employee time calendar and account in payroll input maintenance out interface that includes the notify of employee time account, and notify of employee time calendar service operations;

an employee time confirmation view of service transaction document management in interface that includes the maintain service operation;

an employee time information migration in interface that includes the create employee time information service operation;

an employment migration in interface that includes the create employment service operation;

an FR employer regulatory compliance in payroll input maintenance out interface that includes the notify of FR employee social insurance arrangement service operation;

a GB employer regulatory compliance in payroll input maintenance out interface that includes the notify of GB employee social insurance arrangement, and notify of GB employee tax arrangement service operations;

an internal acknowledgement out interface that includes the notify of internal acknowledgement cancellation, and notify of internal acknowledgement service operations;

an IT employer regulatory compliance in payroll input maintenance out interface that includes the notify of IT employee tax arrangement, and notify of IT employee social insurance arrangement service operations;

an NL employer regulatory compliance in payroll input maintenance out interface that includes the notify of NL employee tax arrangement, and notify of NL employee social insurance arrangement service operations;

a payroll process employee payroll administration notification in interface that includes the maintain collection of payroll process views service operation;

a project task confirmation in interface that includes the maintain employee time confirmation view of project service operation;

a project task confirmation out interface that includes the notify of project task confirmation service operation;

a service provision accounting out interface that includes the notify of service provision cancellation, and notify of service provision service operations;

an SG employer regulatory compliance in payroll input maintenance out interface that includes the notify of SG employee tax arrangement, and notify of SG employee social insurance arrangement service operations;

a US employer regulatory compliance in payroll input maintenance out interface that includes the notify of US employee tax arrangement service operation; and a ZA employer regulatory compliance in payroll input maintenance out interface that includes the notify of ZA employee tax arrangement and the notify of ZA employee social insurance arrangement service operations.

3. The system of claim 1, wherein the computer software implementing the create employee arrangements, create employee compensation agreement, create employee payroll agreement, create employee time information, create employment, maintain, maintain collection of payroll process view, maintain employee time confirmation view of project, notify of AT employee social insurance arrangement, notify of AT employee tax arrangement, notify of AU employee pension insurance arrangement, notify of AU employee tax arrangement, notify of CA employee tax arrangement, notify of CH employee social insurance arrangement, notify of CH employee tax arrangement, notify of CN employee social insurance arrangement, notify of CN employee tax arrangement, notify of DE employee social insurance arrangement, notify of DE employee tax arrangement, notify of DK employee social insurance arrangement, notify of DK employee tax arrangement, notify of employee compensation agreement, notify of employee payroll agreement, notify of employee time account, notify of employee time calendar, notify of FR employee social insurance arrangement, notify of GB employee social insurance arrangement, notify of GB employee tax arrangement, notify of internal acknowledgement, notify of internal acknowledgement cancellation, notify of IT employee social insurance arrangement, notify of IT employee tax arrangement, notify of NL employee social insurance arrangement, notify of NL employee tax arrangement, notify of IN employee social insurance arrangement, notify of IN employee tax arrangement, notify of planned working times, notify of project task confirmation, notify of service provision, notify of service provision cancellation, notify of SG employee social insurance arrangement, notify of SG employee tax arrangement, notify of US employee tax arrangement, notify of ZA employee social insurance arrangement, and notify of ZA employee tax arrangement service operations is deployed on one hardware platform.

4. The system of claim 1, wherein the computer software implementing the create employee arrangements, create employee compensation agreement, create employee payroll agreement, create employee time information, create employment, maintain, maintain collection of payroll process view, maintain employee time confirmation view of project, notify of AT employee social insurance arrangement, notify of AT employee tax arrangement, notify of AU employee pension insurance arrangement, notify of AU employee tax arrangement, notify of CA employee tax arrangement, notify of CH employee social insurance arrangement, notify of CH employee tax arrangement, notify of CN employee social insurance arrangement, notify of CN employee tax arrangement, notify of DE employee social insurance arrangement, notify of DE employee tax arrangement, notify of DK employee social insurance arrangement, notify of DK employee tax arrangement, notify of employee compensation agreement, notify of employee payroll agreement, notify of employee time account, notify of employee time calendar, notify of FR employee social insurance arrangement, notify of GB employee social insurance arrangement, notify of GB employee tax arrangement, notify of internal acknowledgement, notify of internal acknowledgement cancellation, notify of IT employee social insurance arrangement, notify of IT employee tax arrangement, notify of NL employee social insurance arrangement, notify of NL employee tax arrangement, notify of IN employee social insurance arrangement, notify of IN employee tax arrangement, notify of planned working times, notify of project task confirmation, notify of service provision, notify of service provision cancellation, notify of SG employee social insurance arrangement, notify of SG employee tax arrangement, notify of US employee tax arrangement, notify of ZA employee social insurance arrangement, and notify of ZA employee tax arrangement service operations is deployable on one hardware platform.

5. The system of claim 1, wherein:
the computer software deployed on the computer system comprises a plurality of process components, each of the process components being a package of software deployed and executing on the computer system and implementing a respective and distinct business process, the plurality of process components including:
an AT employer regulatory compliance process component used to combine all reporting and other administrative activities that an employer in Austria is obliged to perform with respect to employees;
an AU employer regulatory compliance process component used to combine all activities an employer in Australia is obliged to perform with respect to employees;
a CA employer regulatory compliance process component used to combine all activities an employer in Canada is obliged to perform with respect to employees;
a CH employer regulatory compliance process component used to combine all reporting and other administrative activities that an employer in Switzerland is obliged to perform with respect to employees;
a CN employer regulatory compliance process component used to combine all reporting and other administrative activities that employers in China, with respect to employees, are legally obligated to perform;
an IN employer regulatory compliance process component used to combine all reporting and other administrative activities that employers in India, with respect to employees, are legally obligated to perform;
a compensation management process component used to plan and create a specification of compensation data for employees using appropriate reward strategies, which are based on predefined compensation structures and components;
a DE employer regulatory compliance process component used to administrate employee data and reporting to authorities that employers in Germany are legally obligated to perform;
a DK employer regulatory compliance process component used to combine all reporting and other administrative activities that an employer in Denmark is obliged to perform with respect to employees;
an employee payroll administration process component used to administrate the employee specific payroll agreement and the overview of completed and planned payroll processes;
an FR employer regulatory compliance process component used to administrate employee data and reporting to authorities that employers in France are legally obligated to perform;
a GB employer regulatory compliance process component used to administrate employee data and reporting to authorities that employers in the United Kingdom are legally obligated to perform;
a human capital master data management process component used to manage work agreements, employments, and human capital master data that is used in different human capital management areas;
an IT employer regulatory compliance process component used to administrate employee data and reporting to authorities that employers in Italy are legally obligated to perform;

an NL employer regulatory compliance process component used to combine all activities an employer in Netherlands is obliged to perform with respect to employees;
a personnel administration process component used to administrate personnel changes concerning employee master data and work agreements;
an SG employer regulatory compliance process component used to combine all activities an employer in Singapore is obliged to perform with respect to employees;
a time and labor management process component used to manage employees' planned working times, and record and valuate work performed and absence times;
a US employer regulatory compliance process component used to administrate employee data and reporting to authorities that employers in the United States of America are legally obligated to perform; and
a ZA employer regulatory compliance process component used to combine all activities an employer in South Africa is obliged to perform with respect to employees; and wherein:
the AT employer regulatory compliance process component implements the create employee arrangements, notify of AT employee social insurance arrangement, and notify of AT employee tax arrangement service operations;
the AU employer regulatory compliance process component implements the create employee arrangements, notify of AU employee pension insurance arrangement, and notify of AU employee tax arrangement service operations;
the CA employer regulatory compliance process component implements the create employee arrangements, and notify of CA employee tax arrangement service operations;
the CH employer regulatory compliance process component implements the create employee arrangements, notify of CH employee social insurance arrangement, and notify of CH employee tax arrangement service operations;
the CN employer regulatory compliance process component implements the create employee arrangements, notify of CN employee social insurance arrangement, and notify of CN employee tax arrangement service operations;
the compensation management process component implements the create employee compensation agreement, and notify of employee compensation agreement service operations;
the DE employer regulatory compliance process component implements the create employee arrangements, notify of DE employee social insurance arrangement, and notify of DE employee tax arrangement service operations;
the DK employer regulatory compliance process component implements the create employee arrangements, notify of DK employee social insurance arrangement, and notify of DK employee tax arrangement service operations;
the IN employer regulatory compliance process component implements the create employee arrangements, notify of IN employee social insurance arrangement, and notify of IN employee tax arrangement service operations;
the employee payroll administration process component implements the create employee payroll agreement, maintain collection of payroll process views, and notify of employee payroll agreement service operations;
the FR employer regulatory compliance process component implements the create employee arrangements, and notify of FR employee social insurance arrangement service operations;
the GB employer regulatory compliance process component implements the create employee arrangements, notify of GB employee social insurance arrangement, and notify of GB employee tax arrangement service operations;
the IT employer regulatory compliance process component implements the create employee arrangements, notify of IT employee social insurance arrangement, and notify of IT employee tax arrangement service operations;
the NL employer regulatory compliance process component implements the create employee arrangements, notify of NL employee social insurance arrangement, and notify of NL employee tax arrangement service operations;
the personnel administration process component implements the create employment service operation;
the SG employer regulatory compliance process component implements the create employee arrangements, notify of SG employee social insurance arrangement, and notify of SG employee tax arrangement service operations;
the time and labor management process component implements the create employee time information, maintain, maintain employee time confirmation view of project, notify of employee time account, notify of employee time calendar, notify of internal acknowledgement, notify of internal acknowledgement cancellation, notify of planned working times, notify of project task confirmation, notify of service provision, and notify of service provision cancellation service operations;
the US employer regulatory compliance process component implements the create employee arrangements, and notify of US employee tax arrangement service operations; and
the ZA employer regulatory compliance process component implements the create employee arrangements, notify of ZA employee social insurance arrangement, and notify of ZA employee tax arrangement service operations.

6. The system of claim 1, wherein the computer software deployed on the computer system comprises:
a plurality of deployment units, each of the deployment units being a package of software packaged together to be deployed on a single physical hardware platform, the plurality of deployment units including a human capital management deployment unit, the human capital management deployment unit being a package of software packaged together to be deployed on a single physical hardware platform, the human capital management deployment unit handling the management of essential employee-related processes in a company, such as personnel administration, time and labor management, and compensation management and includes integration with payroll, wherein:
the human capital management deployment unit implements the create employee arrangements, create employee compensation agreement, create employee payroll agreement, create employee time information, create employment, maintain, maintain collection of payroll process view, maintain employee time confirmation view of project, notify of AT employee social insurance arrangement, notify of AT employee tax arrangement, notify of AU employee pension insurance arrangement, notify of AU employee tax arrangement, notify of CA employee tax arrangement, notify of CH employee social insurance arrangement, notify of CH employee tax arrangement, notify of CN employee social insurance arrangement, notify of CN employee tax arrangement, notify of IN employee social insurance arrangement, notify of IN employee tax arrangement, notify of DE employee social insurance arrangement, notify of DE employee tax arrangement, notify of DK employee social insurance arrangement, notify of DK employee tax arrangement, notify of employee compensation agreement, notify of employee payroll agreement, notify of employee time account, notify of employee time calendar, notify of FR employee social insurance arrangement, notify of GB employee social insurance arrangement, notify of GB employee tax arrangement, notify of internal acknowledgement, notify of internal acknowledgement cancellation, notify of IT employee social insurance arrangement, notify of IT employee tax arrangement, notify of NL employee social insurance arrangement, notify of NL employee tax arrangement, notify of planned working times, notify of project task confirmation, notify of service provision, notify of service provision cancellation, notify of SG employee social insurance arrangement, notify of SG employee tax arrangement, notify of US employee tax arrangement, notify of ZA employee social insurance arrangement, and notify of ZA employee tax arrangement service operations.

7. The system of claim 1, further comprising a repository of service descriptions, the repository including a standards-based description of each of the plurality of service operations.

8. A computer program product encoded on a tangible machine-readable information carrier for implementing a plurality of services, the product comprising computer software operable to implement on a computer system service operations, the service operations comprising:

a first create employee arrangements operation to create business objects for employee arrangements relating to an AT employer regulatory compliance process component;

a notify of AT employee social insurance arrangement operation operable to notify the payroll processing deployment unit about new or changed social insurance data for an AT employee in the human capital management deployment unit;

a notify of AT employee tax arrangement operation operable to notify the payroll processing deployment unit about new or changed tax data for an AT employee in the human capital management deployment unit;

a second create employee arrangements operation operable to create business objects for employee arrangements relating to an AU employer regulatory compliance process component;

a notify of AU employee pension insurance arrangement operation operable to notify the payroll processing deployment unit about new or changed pension insurance data for an AU employee in the human capital management deployment unit;

a notify of AU employee tax arrangement operation operable to notify the payroll processing deployment unit about new or changed tax data for an AU employee in the human capital management deployment unit;

a third create employee arrangements operation operable to create business objects for employee arrangements relating to a CA employer regulatory compliance process component;

a notify of CA employee tax arrangement operation operable to notify the payroll processing deployment unit about new or changed tax data for a CA employee in the human capital management deployment unit;

a fourth create employee arrangements operation operable to create business objects for employee arrangements relating to a CH employer regulatory compliance process component;

a notify of CH employee social insurance arrangement operation operable to notify the payroll processing deployment unit about new or changed social insurance data for a CH employee in the human capital management deployment unit;

a notify of CH employee tax arrangement operation operable to notify the payroll processing deployment unit about new or changed tax data for a CH employee in the human capital management deployment unit;

a fifth create employee arrangements operation operable to create business objects for employee arrangements relating to a DK employer regulatory compliance process component;

a notify of DK employee social insurance arrangement operation operable to notify the payroll processing deployment unit about new or changed social insurance data for a DK employee in the human capital management deployment unit;

a notify of DK employee tax arrangement operation operable to notify the payroll processing deployment unit about new or changed tax data for a DK employee in the human capital management deployment unit;

a sixth create employee arrangements operation operable to create business objects for employee arrangements relating to an NL employer regulatory compliance process component;

a notify of NL employee social insurance arrangement operation operable to notify the payroll processing deployment unit about new or changed social insurance data for an NL employee in the human capital management deployment unit;

a notify of NL employee tax arrangement operation operable to notify the payroll processing deployment unit about new or changed tax data for an NL employee in the human capital management deployment unit;

a seventh create employee arrangements operation operable to create business objects for employee arrangements relating to an SG employer regulatory compliance process component;

a notify of SG employee social insurance arrangement operation operable to notify the payroll processing deployment unit about new or changed social insurance data for an SG employee in the human capital management deployment unit;

a notify of SG employee tax arrangement operation operable to notify the payroll processing deployment unit about new or changed tax data for a SG employee in the human capital management deployment unit;

an eighth create employee arrangements operation operable to create business objects for employee arrangements relating to a ZA employer regulatory compliance process component;
a notify of ZA employee social insurance arrangement operation operable to notify the payroll processing deployment unit about new or changed social insurance data for a ZA employee in the human capital management deployment unit;
a notify of ZA employee tax arrangement operation operable to notify the payroll processing deployment unit about new or changed tax data for a ZA employee in the human capital management deployment unit;
a ninth create employee arrangements operation operable to create business objects for employee arrangements relating to a CN employer regulatory compliance process component;
a notify of CN employee social insurance arrangement operation operable to notify the payroll processing deployment unit about new or changed social insurance data for a CN employee in the human capital management deployment unit;
a notify of CN employee tax arrangement operation operable to notify the payroll processing deployment unit about new or changed tax data for a CN employee in the human capital management deployment unit;
a create employee compensation agreement operation operable to create an employee compensation agreement;
a notify of employee compensation agreement operation operable to notify the process component payroll processing about the agreement between an employer and an employee detailing all compensation components that are relevant to the employee;
a tenth create employee arrangements operation operable to create business objects for employee arrangements relating to a DE employer regulatory compliance process component;
a notify of DE employee social insurance arrangement operation operable to notify the payroll processing deployment unit about new or changed social insurance data for a DE employee in the human capital management deployment unit;
a notify of DE employee tax arrangement operation operable to notify the payroll processing deployment unit about new or changed tax data for a DE employee in the human capital management deployment unit;
a create employee payroll agreement operation operable to convert information about payroll agreement data of an employee which is to be migrated from a legacy system into employee payroll administration;
a maintain collection of payroll process view operation operable to notify the view of the payroll process in the human capital management deployment unit of changes to the payroll process business object;
a notify of employee payroll agreement operation operable to notify the payroll deployment unit of changes to the employee payroll agreement business object in the human capital management deployment unit;
an eleventh create employee arrangements operation operable to create business objects for employee arrangements relating to a FR employer regulatory compliance process component;
a notify of FR employee social insurance arrangement operation operable to notify the payroll processing deployment unit about new or changed social insurance data for a FR employee in the human capital management deployment unit;
a twelfth create employee arrangements operation operable to create business objects for employee arrangements relating to a GB employer regulatory compliance process component;
a notify of GB employee social insurance arrangement operable operation to notify the payroll processing deployment unit about new or changed social insurance data for a GB employee in the human capital management deployment unit;
a notify of GB employee tax arrangement operation operable to notify the payroll processing deployment unit about new or changed tax data for a GB employee in the human capital management deployment unit;
a thirteenth create employee arrangements operation operable to create business objects for employee arrangements relating to a IT employer regulatory compliance process component;
a notify of IT employee social insurance arrangement operation operable to notify the payroll processing deployment unit about new or changed social insurance data for an IT employee in the human capital management deployment unit;
a notify of IT employee tax arrangement operation operable to notify the payroll processing deployment unit about new or changed tax data for an IT employee in the human capital management deployment unit;
a create employment operation operable to convert information about an employment which is to be migrated from a legacy system into employment based on message type employment migrate request;
a create employee time information operation operable to convert information about an employee's time data that is to be migrated from a legacy system to time and labor management;
a maintain operation operable to create, change, or delete an employee time confirmation view of service transaction document;
a maintain employee time confirmation view of project operation operable to update the employee time confirmation view of project business object based on changes to the project business object in project processing;
a notify of employee time account operation operable to notify the payroll processing process component of changes to the employee time account business object;
a notify of employee time calendar operation operable to notify payroll processing of changes to the employee time calendar business object;
a notify of internal acknowledgement operation operable to notify goods and service acknowledgement of a service provided by an external employee sent when an active employee time that contains information relevant for goods and service acknowledgement is created, changed, or cancelled;
a notify of internal acknowledgement cancellation operation operable to notify goods and service acknowledgement of the cancellation of an externally provided service sent when an active employee time that contains information relevant for goods and service acknowledgement is cancelled;
a notify of planned working times operation operable to notify the country-specific employee payroll input business object about planned working times;
a notify of project task confirmation operation operable to notify project processing of a project task confirmation or a project task status change sent when project-relevant information is created, changed, or cancelled in an active employee time;
a notify of service provision operation operable to notify accounting of a service provision sent when an active employee time that contains information relevant for accounting is created;
a notify of service provision cancellation operation operable to notify accounting of the cancellation of a service provision sent when an active employee time that contains information relevant for accounting is cancelled;
a fourteenth create employee arrangements operation operable to create business objects for employee arrangements relating to the US employer regulatory compliance process component;
a notify of US employee tax arrangement operation operable to notify the payroll processing deployment unit about new or changed tax data for a US employee in the human capital management deployment unit;
a fifteenth create employee arrangements operation operable to create business objects fro employee arrangements relating to the IN employer regulatory compliance process component; and
a notify of IN employee tax arrangement operation operable to notify the payroll processing deployment unit about new or changed tax data for an IN employee in the human capital management deployment unit.

9. The product of claim 8, wherein the computer software comprises:
a plurality of process components, each of the process components being a package of software deployed and executing on the computer system and implementing a respective and distinct business process, the plurality of process components including:
an AT employer regulatory compliance process component used to combine all reporting and other administrative activities that an employer in Austria is obliged to perform with respect to employees;
an AU employer regulatory compliance process component used to combine all activities an employer in Australia is obliged to perform with respect to employees;
a CA employer regulatory compliance process component used to combine all activities an employer in Canada is obliged to perform with respect to employees;
a CH employer regulatory compliance process component used to combine all reporting and other administrative activities that an employer in Switzerland is obliged to perform with respect to employees;
a CN employer regulatory compliance process component used to combine all reporting and other administrative activities that employers in China, with respect to employees, are legally obligated to perform;
an IN employer regulatory compliance process component used to combine all reporting and other administrative activities that employers in India, with respect to employees, are legally obligated to perform;
a compensation management process component used to plan and create a specification of compensation data for employees using appropriate reward strategies, which are based on predefined compensation structures and components;
a DE employer regulatory compliance process component used to administrate employee data and reporting to authorities that employers in Germany are legally obligated to perform;
a DK employer regulatory compliance process component used to combine all reporting and other administrative activities that an employer in Denmark is obliged to perform with respect to employees;
an employee payroll administration process component used to administrate the employee specific payroll agreement and the overview of completed and planned payroll processes;
an FR employer regulatory compliance process component used to administrate employee data and reporting to authorities that employers in France are legally obligated to perform;
a GB employer regulatory compliance process component used to administrate employee data and reporting to authorities that employers in the United Kingdom are legally obligated to perform;
a human capital master data management process component used to manage work agreements, employments, and human capital master data that is used in different human capital management areas;
an IT employer regulatory compliance process component used to administrate employee data and reporting to authorities that employers in Italy are legally obligated to perform;
an NL employer regulatory compliance process component used to combine all activities an employer in Netherlands is obliged to perform with respect to employees;
a personnel administration process component used to administrate personnel changes concerning employee master data and work agreements;
an SG employer regulatory compliance process component used to combine all activities an employer in Singapore is obliged to perform with respect to employees;
a time and labor management process component used to manage employees' planned working times, and record and valuate work performed and absence times;
a US employer regulatory compliance process component used to administrate employee data and reporting to authorities that employers in the United States of America are legally obligated to perform; and
a ZA employer regulatory compliance process component used to combine all activities an employer in South Africa is obliged to perform with respect to employees; and wherein:
the AT employer regulatory compliance process component implements the create employee arrangements, notify of AT employee social insurance arrangement, and notify of AT employee tax arrangement service operations;
the AU employer regulatory compliance process component implements the create employee arrangements, notify of AU employee pension insurance arrangement, and notify of AU employee tax arrangement service operations;
the CA employer regulatory compliance process component implements the create employee arrangements, and notify of CA employee tax arrangement service operations;
the CH employer regulatory compliance process component implements the create employee arrangements, notify of CH employee social insurance arrangement, and notify of CH employee tax arrangement service operations;

the CN employer regulatory compliance process component implements the create employee arrangements, notify of CN employee social insurance arrangement, and notify of CN employee tax arrangement service operations;

the IN employer regulatory compliance process component implements the create employee arrangements, notify of IN employee social insurance arrangement, and notify of IN employee tax arrangement service operations;

the compensation management process component implements the create employee compensation agreement, and notify of employee compensation agreement service operations;

the DE employer regulatory compliance process component implements the create employee arrangements, notify of DE employee social insurance arrangement, and notify of DE employee tax arrangement service operations;

the DK employer regulatory compliance process component implements the create employee arrangements, notify of DK employee social insurance arrangement, and notify of DK employee tax arrangement service operations;

the employee payroll administration process component implements the create employee payroll agreement, maintain collection of payroll process views, and notify of employee payroll agreement service operations;

the FR employer regulatory compliance process component implements the create employee arrangements, and notify of FR employee social insurance arrangement service operations;

the GB employer regulatory compliance process component implements the create employee arrangements, notify of GB employee social insurance arrangement, and notify of GB employee tax arrangement service operations;

the IT employer regulatory compliance process component implements the create employee arrangements, notify of IT employee social insurance arrangement, and notify of IT employee tax arrangement service operations;

the NL employer regulatory compliance process component implements the create employee arrangements, notify of NL employee social insurance arrangement, and notify of NL employee tax arrangement service operations;

the personnel administration process component implements the create employment service operation;

the SG employer regulatory compliance process component implements the create employee arrangements, notify of SG employee social insurance arrangement, and notify of SG employee tax arrangement service operations;

the time and labor management process component implements the create employee time information, maintain, maintain employee time confirmation view of project, notify of employee time account, notify of employee time calendar, notify of internal acknowledgement, notify of internal acknowledgement cancellation, notify of planned working times, notify of project task confirmation, notify of service provision, and notify of service provision cancellation service operations;

the US employer regulatory compliance process component implements the create employee arrangements, and notify of US employee tax arrangement service operations; and the ZA employer regulatory compliance process component implements the create employee arrangements, notify of ZA employee social insurance arrangement, and notify of ZA employee tax arrangement service operations.

10. The product of claim 9, wherein:

each of the plurality of process components is assigned to no more than one deployment unit among multiple deployment units, and each deployment unit is deployable on a separate computer hardware platform independent of every other deployment unit; and all interaction between a process component in one deployment unit and any other process component in any other deployment unit takes place through the respective service operations of the two process components.

11. The product of claim 10, wherein the deployment units comprise a human capital management deployment unit that includes the AT employer regulatory compliance process component, the AU employer regulatory compliance process component, the CA employer regulatory compliance process component, the CH employer regulatory compliance process component, the CN employer regulatory compliance process component, the compensation management process component, the DE employer regulatory compliance process component, the DK employer regulatory compliance process component, the employee payroll administration process component, the FR employer regulatory compliance process component, the GB employer regulatory compliance process component, the human capital master data management process component, the IT employer regulatory compliance process component, the NL employer regulatory compliance process component, the personnel administration process component, the SG employer regulatory compliance process component, the time and labor management process component, the US employer regulatory compliance process component, and the ZA employer regulatory compliance process component.

12. The product of claim 9, wherein the computer software comprises:

the human capital management deployment unit that includes an AT employee social insurance arrangement, an AT employee tax arrangement, an AU employee pension insurance arrangement, an AU employee tax arrangement, a CA employee tax arrangement, a CH employee social insurance arrangement, a CH employee tax arrangement, a CN employee social insurance arrangement, a CN employee tax arrangement, an IN employee social insurance arrangement, an IN employee tax arrangement a compensation component type, a compensation structure, a DE employee social insurance arrangement, a DE employee tax arrangement, a DK employee social insurance arrangement, a DK employee tax arrangement, an employee compensation agreement, an employee payroll agreement, an employee time, an employee time account, an employee time account maintenance request, an employee time agreement, an employee time calendar, an employee time confirmation view of project, an employee time confirmation view of service transaction document, an employee time confirmation work list, an employee time recording view, an employee time valuation, an employee time valuation period closure run, an employment, a FR employee social insurance arrangement, a GB employee social insurance arrangement, a GB employee tax arrangement, a human capital management view of payroll process, an IT employee social insurance arrangement, an IT employee tax arrangement, a maternity protection, a NL employee social insurance arrangement, a NL employee tax arrangement, a parental leave, a personnel hiring, a personnel leaving, a personnel transfer, an SG employee social insurance arrangement, an SG employee tax arrangement, a special leave, a US employee tax arrangement, a work agreement, a working time model, a working time model catalogue, a ZA employee social insurance arrangement, and a ZA employee tax arrangement business object; and wherein:

the AT employee social insurance arrangement business object represents an arrangement for the employee by all responsible Austrian bodies that are legally responsible for administering the employee's social insurance contributions;

the AT employee tax arrangement business object represents an arrangement between the employee and the tax authorities of Austria that defines the rules of how the employer must calculate and report taxes for this employee to be compliant with the legal requirements of Austria;

the AU employee pension insurance arrangement business object represents an arrangement for the employee by all responsible Australian bodies that are legally responsible for administering the employee's social insurance contributions;

the AU employee tax arrangement business object represents an arrangement between the employee and the tax authorities of Australia that defines the rules of how the employer must calculate and report taxes for this employee to be compliant with the legal requirements of Australia;

the CA employee tax arrangement business object represents an arrangement between the employee and the tax authorities of Canada that defines the rules of how the employer must calculate and report taxes for this employee to be compliant with the legal requirements of Canada;

the CH employee social insurance arrangement business object represents an arrangement for the employee by all responsible Switzerland bodies that are legally responsible for administering the employee's social insurance contributions;

the CH employee tax arrangement business object represents an arrangement between the employee and the tax authorities of the Switzerland that defines the rules of how the employer must calculate and report taxes for this employee to be compliant with the legal requirements of Switzerland;

the CN employee social insurance arrangement business object represents an arrangement for the employee by the People's Republic of China bodies that are legally responsible for administering the employee's social insurance contributions and benefits;

the CN employee tax arrangement business object represents an arrangement between the employee and the tax authorities of the People's Republic of China that defines the rules of how the employer must calculate and report taxes for this employee to be compliant with the legal requirements;

the IN employee social insurance arrangement business object represents an arrangement for the employee by the Indian bodies that are legally responsible for administering the employee's social insurance contributions and benefits;

the IN employee tax arrangement business object represents an arrangement between the employee and the tax authorities of India that defines the rules of how the employer must calculate and report taxes for this employee to be compliant with the legal requirements;

the compensation component type business object represents a description of the employee compensation components in the context of human resources;

the compensation structure business object represents an organized structure of pay grade ranges that reflects the value of tasks and activities in the company;

the DE employee social insurance arrangement business object represents an arrangement for the employee by the German bodies that are legally responsible for administering the employee's social insurance contributions and benefits;

the DE employee tax arrangement business object represents an arrangement by the German tax authority for the employee, concerning calculation and reporting of income tax deductions according to German legal requirements;

the DK employee social insurance arrangement business object represents an arrangement for the employee by all responsible Danish bodies that are legally responsible for administering the employee's social insurance contributions;

the DK employee tax arrangement business object represents an arrangement between the employee and the tax authorities of the Denmark that defines the rules of how the employer must calculate and report taxes for this employee to be compliant with the legal requirements of Denmark;

the employee compensation agreement business object represents an agreement between an employer and an employee detailing all compensation components that are relevant to the employee;

the employee payroll agreement business object represents an agreement between the employer and employee concerning the personal conditions for payroll processing;

the employee time business object represents a recorded document of the working times of an internal or external employee;

the employee time account business object represents a summary of valuated employee times and of periodic valuations administered by employee time valuation;

the employee time account maintenance request business object represents a request to create, modify or cancel an employee time account;

the employee time agreement business object represents an agreement between employer and employee consisting of time management stipulations that are derived from legal, company-specific, and pay-related provisions, and from terms agreed individually with the employee;

the employee time calendar business object represents a read-only calendar representation of time valuation results that are derived from the recorded times of an employee;

the employee time confirmation view of project business object represents a view of a project restricted to those project tasks for which employee times are confirmed;

the employee time confirmation view of service transaction document business object represents a view of a business transaction document specifying sold or purchased services that are relevant for employee time confirmation;

the employee time confirmation work list business object represents a list of work items that are assigned to an employee and that are to be used to confirm the employee times;

the employee time recording view business object represents a view of several times of one employee for recording purposes;

the employee time valuation business object represents an object responsible for the execution of all valuations of employee times and other time management documents for one internal or external employee;

the employee time valuation period closure run business object represents the specification of an automated run that creates period closure dates in employee time valuations based on employees;

the employment business object represents a relationship that comes into being by virtue of one or more valid work agreements;

the FR employee social insurance arrangement business object represents an arrangement for the employee by all responsible French bodies that are legally responsible for administering the employee's social insurance contributions;

the GB employee social insurance arrangement business object represents an arrangement for the employee by United Kingdom social insurance authority concerning calculation and reporting of contributions according to the United Kingdom legal requirements;

the GB employee tax arrangement business object represents an arrangement by the United Kingdom tax authority for the employee concerning calculation and reporting of income tax deductions according to United Kingdom legal requirements;

the human capital management view of payroll process business object represents a view from human capital management of a payroll process;

the IT employee social insurance arrangement business object represents an arrangement for the employee by the Italian bodies that are legally responsible for administering the employee's social insurance contributions and benefits;

the IT employee tax arrangement business object represents an arrangement by the responsible tax authorities for the employee concerning calculation and reporting of income tax deductions according to Italian legal requirements;

the maternity protection business object represents a leave of absence of a female employee provided for under national regulations in relation to the birth of a child;

the NL employee social insurance arrangement business object represents an arrangement for the employee by all responsible Dutch bodies that are legally responsible for administering the employee's social insurance contributions;

the NL employee tax arrangement business object represents an arrangement between the employee and the tax authorities of the Netherlands that defines the rules of how the employer must calculate and report taxes for this employee to be compliant with the legal requirements of Netherlands;

the parental leave business object represents a leave of absence of an employee as specified by the national laws and regulations in relation to time off work to care for a child;

the personnel hiring business object represents a first hiring, rehiring, or creation of another work agreement of an employee;

the personnel leaving business object represents the termination of an employee's work agreement;

the personnel transfer business object represents an organizational reassignment of an employee within the company;

the SG employee social insurance arrangement business object represents an arrangement for the employee by all responsible Singaporean bodies that are legally responsible for administering the employee's social insurance contributions;

the SG employee tax arrangement business object represents an arrangement between the employee and the tax authorities of Singapore that defines the rules of how the employer must calculate and report taxes for this employee to be compliant with the legal requirements of Singapore;

the special leave business object represents an absence from work due to exceptional circumstances, either at the request of the employee or in accordance with country-specific legal regulations;

the US employee tax arrangement business object represents an arrangement by the responsible tax authorities for the employee concerning calculation and reporting of withholding tax according to us federal, state, and local legal requirements;

the work agreement business object represents a contract between employer and employee that obligates the employee to provide his or her labor and the employer to provide the agreed compensation;

the working time model business object represents an employee-independent, structured description of working times;

the working time model catalogue business object represents a structured directory of the available working time models;

the ZA employee social insurance arrangement business object represents an arrangement for the employee by all responsible South African bodies that are legally responsible for administering the employee's social insurance contributions; and the ZA employee tax arrangement business object represents an arrangement between the employee and the tax authorities of South Africa that defines the rules of how the employer must calculate and report taxes for this employee to be compliant with the legal requirements of South Africa.

13. The product of claim 10, wherein the deployment units comprise a human capital management deployment unit that implements a create employee arrangements, a create employee compensation agreement, a create employee payroll agreement, a create employee time information, a create employment, a maintain, a maintain collection of payroll process view, a maintain employee time confirmation view of project, a notify of AT employee social insurance arrangement, a notify of AT employee tax arrangement, a notify of AU employee pension insurance arrangement, a notify of AU employee tax arrangement, a notify of CA employee tax arrangement, a notify of CH employee social insurance arrangement, a notify of CH employee tax arrangement, a notify of CN employee social insurance arrangement, a notify of CN employee tax arrangement, a notify of IN employee social insurance arrangement, a notify of IN employee tax arrangement, a notify of DE employee social insurance arrangement, a notify of DE employee tax arrangement, a notify of DK employee social insurance arrangement, a notify of DK employee tax arrangement, a notify of employee compensation agreement, a notify of employee payroll agreement, a notify of employee time account, a notify of employee time calendar, a notify of FR employee social insurance arrangement, a notify of GB employee social insurance arrangement, a notify of GB employee tax arrangement, a notify of internal acknowledgement, a notify of internal acknowledgement cancellation, a notify of IT employee social insurance arrangement, a notify of IT employee tax arrangement, a notify of NL employee social insurance arrangement, a notify of NL employee tax arrangement, a notify of planned working times, a notify of project task confirmation, a notify of service provision, a notify of service provision cancellation, a notify of SG employee social insurance arrangement, a notify of SG employee tax arrangement, a notify of US employee tax arrangement, a notify of ZA employee social insurance arrangement, and a notify of ZA employee tax arrangement service operations.

14. The product of claim 10, wherein the deployment units comprise a human capital management deployment unit that implements an AT employee social insurance arrangement, an AT employee tax arrangement, an AU employee pension insurance arrangement, an AU employee tax arrangement, a CA employee tax arrangement, a CH employee social insurance arrangement, a CH employee tax arrangement, a CN employee social insurance arrangement, a CN employee tax arrangement, a compensation component type, a compensation structure, a DE employee social insurance arrangement, a DE employee tax arrangement, a DK employee social insurance arrangement, a DK employee tax arrangement, an employee compensation agreement, an employee payroll agreement, an employee time, an employee time account, an employee time account maintenance request, an employee time agreement, an employee time calendar, an employee time confirmation view of project, an employee time confirmation view of service transaction document, an employee time confirmation work list, an employee time recording view, an employee time valuation, an employee time valuation period closure run, an employment, a FR employee social insurance arrangement, a GB employee social insurance arrangement, a GB employee tax arrangement, a human capital management view of payroll process, an IT employee social insurance arrangement, an IT employee tax arrangement, a maternity protection, an NL employee social insurance arrangement, an NL employee tax arrangement, an IN employee social insurance arrangement, an IN employee tax arrangement, a parental leave, a personnel hiring, a personnel leaving, a personnel transfer, a SG employee social insurance arrangement, a SG employee tax arrangement, a special leave, a US employee tax arrangement, a work agreement, a working time model, a working time model catalogue, a ZA employee social insurance arrangement, and a ZA employee tax arrangement business objects.

15. The product of claim 8, wherein:
the AT employer regulatory compliance process component includes an AT employee social insurance arrangement, and an AT employee tax arrangement business object, the AT employee social insurance arrangement being a business object that is an arrangement for the employee by all responsible Austria bodies that are legally responsible for administering the employee's social insurance contributions, and the AT employee tax arrangement being a business object that is an arrangement between the employee and the tax authorities of the Austria that defines the rules of how the employer must calculate and report taxes for this employee to be compliant with the legal requirements of Austria;

the AU employer regulatory compliance process component includes an AU employee pension insurance arrangement, and an AU employee tax arrangement business object, the AU employee pension insurance arrangement being a business object that is an arrangement for the employee by all responsible Australian bodies that are legally responsible for administering the employee's social insurance contributions, and the AU employee tax arrangement being a business object that is an arrangement between the employee and the tax authorities of Australia that defines the rules of how the employer must calculate and report taxes for this employee to be compliant with the legal requirements of Australia;

the CA employer regulatory compliance process component includes a CA employee tax arrangement business object, the CA employee tax arrangement being a business object that is an arrangement between the employee and the tax authorities of Canada that defines the rules of how the employer must calculate and report taxes for this employee to be compliant with the legal requirements of Canada;

the CH employer regulatory compliance process component includes a CH employee social insurance arrangement, and a CH employee tax arrangement business object, the CH employee social insurance arrangement being a business object that is an arrangement for the employee by all responsible Switzerland bodies that are legally responsible for administering the employee's social insurance contributions, and the CH employee tax arrangement being a business object that is an arrangement between the employee and the tax authorities of the Switzerland that defines the rules of how the employer must calculate and report taxes for this employee to be compliant with the legal requirements of Switzerland;

the CN employer regulatory compliance process component includes a CN employee social insurance arrangement, and a CN employee tax arrangement business object, the CN employee social insurance arrangement being a business object that is an arrangement for the employee by the People's Republic of China bodies that are legally responsible for administering the employee's social insurance contributions and benefits, and the CN employee tax arrangement being a business object that is an arrangement between the employee and the tax authorities of the People's Republic of China that defines the rules of how the employer must calculate and report taxes for this employee to be compliant with the legal requirements;

the IN employer regulatory compliance process component includes an IN employee social insurance arrangement, and an IN employee tax arrangement business object, the IN employee social insurance arrangement being a business object that is an arrangement for the employee by Indian bodies that are legally responsible for administering the employee's social insurance contributions and benefits, and the IN employee tax arrangement being a business object that is an arrangement between the employee and the tax authorities of India that defines the rules of how the employer must calculate and report taxes for this employee to be compliant with the legal requirements;

the compensation management process component includes a compensation structure, and an employee compensation agreement business object, the compensation structure being a business object that is an organized structure of pay grade ranges, and the employee compensation agreement being a business object that is an agreement between an employer and an employee detailing all compensation components that are relevant to the employee;

the DE employer regulatory compliance process component includes a DE employee social insurance arrangement, and a DE employee tax arrangement business object, the DE employee social insurance arrangement being a business object that is an arrangement for the employee by the German bodies that are legally responsible for administering the employee's social insurance contributions and benefits, and the DE employee tax arrangement being a business object that is an arrangement by the German tax authority for the employee, concerning calculation and reporting of income tax deductions according to German legal requirements;

the DK employer regulatory compliance process component includes a DK employee social insurance arrangement, and a DK employee tax arrangement business object, the DK employee social insurance arrangement being a business object that is an arrangement for the employee by all responsible Danish bodies that are legally responsible for administering the employee's social insurance contributions, and the DK employee tax arrangement being a business object that is an arrangement between the employee and the tax authorities of the Denmark that defines the rules of how the employer must calculate and report taxes for this employee to be compliant with the legal requirements of Denmark;

the employee payroll administration process component includes an employee payroll agreement, and a human capital management view of payroll process business object, the employee payroll agreement being a business object that is an agreement between the employer and employee concerning the personal conditions for payroll processing, and the human capital management view of payroll process being a business object that is a view from human capital management of a payroll process;

the FR employer regulatory compliance process component includes a FR employee social insurance arrangement business object, the FR employee social insurance arrangement being a business object that is an arrangement for the employee by all responsible French bodies that are legally responsible for administering the employee's social insurance contributions;

the GB employer regulatory compliance process component includes a GB employee social insurance arrangement, and a GB employee tax arrangement business object, the GB employee social insurance arrangement being a business object that is an arrangement for the employee by United Kingdom social insurance authority concerning calculation and reporting of contributions according to the United Kingdom legal requirements, and the GB employee tax arrangement being a business object that is an arrangement by the United Kingdom tax authority for the employee concerning calculation and reporting of income tax deductions according to United Kingdom legal requirements;

the human capital master data management process component includes a compensation component type, an employment, and a work agreement business object, the compensation component type being a business object that is a description of the employee compensation components in the context of human resources, the employment being a business object that is a relationship that comes into being by virtue of one or more valid work agreements, and the work agreement being a business object that is a contract between employer and employee that obligates the employee to provide his or her labor and the employer to provide the agreed compensation;

the IT employer regulatory compliance process component includes an IT employee social insurance arrangement, and an IT employee tax arrangement business object, the IT employee social insurance arrangement being a business object that is an arrangement for the employee by the Italian bodies that are legally responsible for administering the employee's social insurance contributions and benefits, and the IT employee tax arrangement being a business object that is an arrangement by the responsible tax authorities for the employee concerning calculation and reporting of income tax deductions according to Italian legal requirements;

the NL employer regulatory compliance process component includes a NL employee social insurance arrangement, and a NL employee tax arrangement business object, the NL employee social insurance arrangement being a business object that is an arrangement for the employee by all responsible Dutch bodies that are legally responsible for administering the employee's social insurance contributions, and the NL employee tax arrangement being a business object that is an arrangement between the employee and the tax authorities of the Netherlands that defines the rules of how the employer must calculate and report taxes for this employee to be compliant with the legal requirements of Netherlands;= the personnel administration process component includes a maternity protection, a parental leave, a personnel hiring, personnel leaving, personnel transfer, and a special leave business object, the maternity protection being a business object that is a leave of absence of a female employee provided for under national regulations in relation to the birth of a child, the parental leave being a business object that is a leave of absence of an employee as specified by the national laws and regulations in relation to time off work to care for a child, the personnel hiring being a business object that is a first hiring, rehiring, or creation of another work agreement of an employee, the personnel leaving being a business object that is a termination of an employee's work agreement, the personnel transfer being a business object that is an organizational reassignment of an employee within the company, and the special leave being a business object that is an absence from work due to exceptional circumstances, either at the request of the employee or in accordance with country-specific legal regulations;

the SG employer regulatory compliance process component includes a SG employee social insurance arrangement, and a SG employee tax arrangement business object, the SG employee social insurance arrangement being a business object that is an arrangement for the employee by all responsible Singaporean bodies that are legally responsible for administering the employee's social insurance contributions, and the SG employee tax arrangement being a business object that is an arrangement between the employee and the tax authorities of the Singapore that defines the rules of how the employer must calculate and report taxes for this employee to be compliant with the legal requirements of Singapore;

the time and labor management process component includes an employee time, an employee time account, an employee time account maintenance request, an employee time agreement, an employee time calendar, an employee time confirmation view of project, an employee time confirmation view of service transaction document, an employee time confirmation work list, an employee time recording view, an employee time valuation, an employee time valuation period closure run, a working time model, and a working time model catalogue business object, the employee time being a business object that is a recorded document of the working times of an internal or external employee, the employee time account being a business object that is a summary of valuated employee times and of periodic valuations administered by employee time valuation, the employee time account maintenance request being a business object that is a request to create, modify or cancel an employee time account, the employee time agreement being a business object that is an agreement between employer and employee consisting of time management stipulations that are derived from legal, company-specific, and pay-related provisions, and from terms agreed individually with the employee, the employee time calendar being a business object that is a read-only calendar representation of time valuation results that are derived from the recorded times of an employee, the employee time confirmation view of project being a business object that is a view of a project restricted to those project tasks for which employee times are confirmed, the employee time confirmation view of service transaction document being a business object that is a view of a business transaction document specifying sold or purchased services that are relevant for employee time confirmation, the employee time confirmation work list being a business object that is a list of work items that are assigned to an employee and that are to be used to confirm the employee times, the employee time recording view being a business object that is a view of several times of one employee for recording purposes, the employee time valuation being a business object that is an object responsible for the execution of all valuations of employee times and other time management documents for one internal or external employee, the employee time valuation period closure run being a business object that is a specification of an automated run that creates period closure dates in employee time valuations based on employees, the working time model being a business object that is an employee-independent, structured description of working times, and the working time model catalogue being a business object that is a structured directory of the available working time models;

the US employer regulatory compliance process component includes a US employee tax arrangement business object, the US employee tax arrangement being a business object that is an arrangement by the responsible tax authorities for the employee concerning calculation and reporting of withholding tax according to US federal, state, and local legal requirements; and the ZA employer regulatory compliance process component includes a ZA employee social insurance arrangement, and a ZA employee tax arrangement business object, the ZA employee social insurance arrangement being a business object that is an arrangement for the employee by all responsible South African bodies that are legally responsible for administering the employee's social insurance contributions, and the ZA employee tax arrangement being a business object that is an arrangement between the employee and the tax authorities of South Africa that defines the rules of how the employer must calculate and report taxes for this employee to be compliant with the legal requirements of South Africa.

16. The product of claim 8, wherein:

each of the process components includes one or more business objects; and none of the business objects of any one of the process components interacts directly with any of the business objects included in any of the other process components.

17. The product of claim 16, wherein the business objects comprise a business process object.

18. The product of claim 16, wherein none of the business objects included in any one of the process components is included in any of the other process components.

19. The product of claim 8, further comprising:

a plurality of process agents, each process agent being either an inbound process agent or an outbound process agent, an inbound process agent being operable to receive a message from an inbound operation, an outbound process agent being operable to cause an outbound operation to send a message, and each process agent being associated with exactly one process component;

the inbound process agents comprise a first inbound process agent operable to start the execution of step requested in a first inbound message by creating or updating one or more business object instances; and the outbound process agents comprise a first asynchronous outbound process agent that is called after a business object that is associated with the first outbound process agent changes.

* * * * *